(12) United States Patent
Yamagishi et al.

(10) Patent No.: US 10,382,801 B2
(45) Date of Patent: *Aug. 13, 2019

(54) TRANSMISSION APPARATUS, TRANSMISSION METHOD, RECEPTION APPARATUS, AND RECEPTION METHOD

(71) Applicant: Saturn Licensing LLC, New York, NY (US)

(72) Inventors: Yasuaki Yamagishi, Kanagawa (JP); Masahito Mori, Kanagawa (JP)

(73) Assignee: SATURN LICENSING LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/948,685

(22) Filed: Apr. 9, 2018

(65) Prior Publication Data

US 2018/0227605 A1 Aug. 9, 2018

Related U.S. Application Data

(63) Continuation of application No. 15/030,539, filed as application No. PCT/JP2014/073352 on Sep. 4, 2014, now Pat. No. 9,998,771.

(30) Foreign Application Priority Data

Oct. 30, 2013 (JP) ................. 2013-224901

(51) Int. Cl.
*H04N 7/173* (2011.01)
*H04N 21/235* (2011.01)
(Continued)

(52) U.S. Cl.
CPC ....... *H04N 21/235* (2013.01); *H04N 21/2381* (2013.01); *H04N 21/435* (2013.01);
(Continued)

(58) Field of Classification Search
CPC .............. H04N 21/235; H04N 21/435; H04N 21/2381; H04N 21/4316; H04N 21/482; H04N 21/84
See application file for complete search history.

(56) References Cited

U.S. PATENT DOCUMENTS 6,029,200 A 2/2000 Beckerman
7,073,193 B2 7/2006 Marsh
(Continued)

FOREIGN PATENT DOCUMENTS

WO WO 2013/043918 A1 3/2013

OTHER PUBLICATIONS

"Mi-Emo: On Signaling Fast Zap Video or Mosaic Service", Sony Corporation, 3GPP TSG-SA4 Meeting #76, Nov. 4-8, 2013, pp. 4, Document for Discussion, S4-131218, Osaka, Japan.
(Continued)

*Primary Examiner* — Pankaj Kumar
*Assistant Examiner* — Timothy R Newlin
(74) *Attorney, Agent, or Firm* — Oblon, McClelland, Maier & Neustadt, L.L.P.

(57) ABSTRACT

The present technology relates to a transmission apparatus, a transmission method, a reception apparatus, and a reception method which can easily obtain a mosaic screen. Metadata of content is distributed, and the metadata is described using an attribute and an attribute value and includes signaling information indicating that a video is a thumbnail video suitable for constituting a mosaic screen, and the attribute indicating information to refer to a file including information to receive content supplied by a service. The present technology can be applied when, for example, content is to be distributed.

32 Claims, 31 Drawing Sheets

(51) Int. Cl.
  *H04N 21/435* (2011.01)
  *H04N 21/2381* (2011.01)
  *H04N 21/431* (2011.01)
  *H04N 21/482* (2011.01)
  *H04N 21/84* (2011.01)

(52) U.S. Cl.
  CPC ....... *H04N 21/4316* (2013.01); *H04N 21/482* (2013.01); *H04N 21/84* (2013.01)

(56) References Cited

U.S. PATENT DOCUMENTS

| | | | |
|---|---|---|---|
| 9,998,771 B2* | 6/2018 | Yamagishi | H04N 21/235 |
| 2007/0036102 A1* | 2/2007 | Hwang | H04H 20/93 |
| | | | 370/328 |
| 2007/0086465 A1* | 4/2007 | Paila | H04H 60/72 |
| | | | 370/394 |
| 2008/0318558 A1 | 12/2008 | Bouaziz | |
| 2009/0094644 A1 | 4/2009 | Jung | |
| 2011/0126232 A1* | 5/2011 | Lee | H04N 5/765 |
| | | | 725/39 |
| 2012/0331508 A1 | 12/2012 | Vare | |
| 2013/0007226 A1 | 1/2013 | White | |
| 2013/0036234 A1 | 2/2013 | Pazos | |
| 2013/0179588 A1 | 7/2013 | McCarthy | |
| 2013/0317919 A1* | 11/2013 | Raman | H04N 19/197 |
| | | | 705/14.73 |
| 2015/0229676 A1 | 8/2015 | Bouaziz | |
| 2016/0198241 A1* | 7/2016 | Kitazato | H04N 21/4345 |
| | | | 725/33 |
| 2016/0255394 A1 | 9/2016 | Yang | |
| 2016/0277774 A1 | 9/2016 | Yamagishi | |
| 2016/0345033 A1 | 11/2016 | Kwak | |

OTHER PUBLICATIONS

3$^{rd}$ Generation Partnership Project, "Technical Specification Group Services and System Aspects", Multimedia Broadcast/Multicast Service (MBMS); Enhanced Mbms Operation, Release 12, Nov. 2013, pp. 9, 3GPP TR 26.848 Vo.5.1.
Mitsuhiro, Hirabayashi, "Realizing the Uninterrupted Video Distribution in the Existing Web Server", MPEG-DASH, Nikkei Electronics, Mar. 19, 2012, pp. 21 (including 12 pages of English translation).
Extended European Search Report issued in corresponding European Application No. 14858943.5 dated Jul. 12, 2017.
"3rd Generation Partnership Project; Technical Specification Group Services and System Aspects; Multimedia Broadcast/Multicast Service (MBMS); Protocols and codecs (Release 11)," 3GPP TS 26.346, V.11.6.0, Sep. 26, 2013, XP050727750, 169 pages.
Hirabayashi, Mitsuhiro: "Realizing Moving Image Delivery With No Drop-outs in an Existing Web Server" Nikkei Electronics, Mar. 19, 2012 with English Translation.
Supplementary Partial European Search Report dated May 26, 2017 in European Patent Application No. 14858943.5.
"3rd Generation Partnership Project; Technical Specification Group Services and System Aspects; Multimedia Broadcast/Multicast Services (MBMS); Enhanced MBMS Operation (Release 12)" 3GPP TR 26.848; XP050727842, Sep. 27, 2013, vol. 5.1, pp. 1-26 (reference previously filed, submitting complete copy now).
"3rd Generation Partnership Project; Technical Specification Group Services and System Aspects; Transparent end-to-end Packet—switched Streaming Service (PSS); Progressive Download and Dynamic Adaptive Streaming over HTTP (3GP-DASH) (Release 12)" 3GPP TS 26.247, XP050712355, Sep. 19, 2013, vol. 12.0, pp. 1-114.
"USD Indication of DASH Transport" Qualcomm Incorporated, Telefon AB LM Ericsson, 3GPP TSG-SA4 Meeting #75, XP050727624, Sep. 18, 2013, vol. SA WG4, 15 Pages.
Combined Chinese Office Action and Search Report dated Jul. 16, 2018 in corresponding Chinese Patent Application No. 201480058365.8 (with English Translation), citing document AO therein, 26 pages.
Office Action dated Dec. 20, 2018 in Japanese Decision of Rejection No. 2015-544850 with English translation, citing document AX therein, 7 pages.
"Service Guide for Mobile Broadcast Services", Approved Version 1.0.1, Open Mobile Alliance, OMA-TS-BCAST_Service_Guide-V1_0_1-20130109-A, Jan. 9, 2013, 17 pages.

* cited by examiner

FIG. 10

- bundleDescription
  - userServiceDescription — bundleDescription/userServiceDescription
    - /@serviceId — bundleDescription/userServiceDescription/@serviceId
    - /DeliveryMethod — bundleDescription/userServiceDescription/DeliveryMethod
      - /@serviceDescriptionURI — bundleDescription/userServiceDescription/DeliveryMethod/@SessionDescriptionURI

FIG. 13

- MPD  [ MPD ]
- /@profile  [ MPD/@profile ]
- /@minBufferTime  [ MPD/@minBufferTime ]
- /Period  [ MPD/Period ]

FIG. 14

```
<MPD ... profiles= ... minBufferTime= ... >
 <Period ... >
  <AdaptationSet ... width='480' height='270' ... >  ~141
   <ViewPoint schemeIdURI="urn:thumbnailVideo" />  ~142
   ...
  </AdaptationSet>
  ...
 </Period>
 ...
</MPD>
```

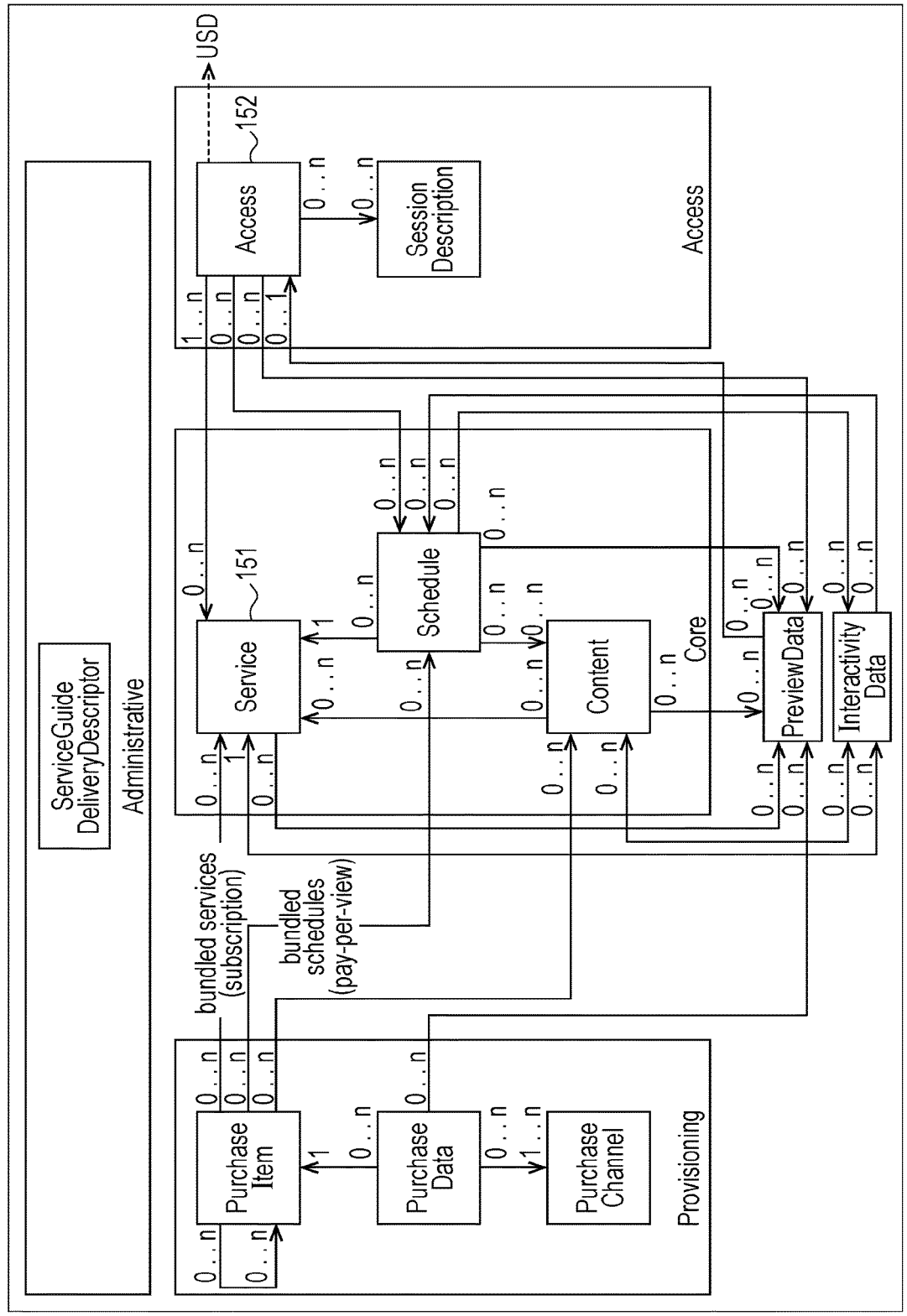

FIG. 16

- Access
  - /@id, /@version    Access/@id, Access/@version
  - /AccessType    Access/AccessType
    - /BroadcastServiceDelivery    Access/AccessType/BroadcastServiceDelivery
      - /SessionDescription    Access/AccessType/BroadcastServiceDelivery/SessionDescription
        - >> /USBDRef    Access/AccessType/BroadcastServiceDelivery/SessionDescription/USBDRef
    - /UnicastServiceDelivery    Access/AccessType/UnicastServiceDelivery
  - /ServiceClass    Access/ServiceClass

FIG. 17

A
```
<Service ... globalServiceID=" (ID UNIQUELY IDENTIFYING THE Service)"
  :
  <ServiceType> 12</ServiceType>
  :
</Service>
```

B
```
<Access ...>
  :
  <AccessType>
    <BroadcastServiceDelivery>
      <SessionDescription>
        <USBDRef>" (3GPP: REFERENCE TO bundleDescription OF MBMS) " </USBDRef>
      </SessionDescription>
    </BroadcastServiceDelivery>
  </AccessType>
  :
  <ServiceReference idRef=" (REFERENCE TO ABOVE Service: VALUE OF Service/@globalServiceID TO BE REFERRED) " />
  :
</Access>
```

FIG. 23

```
<MPD ...profiles= ... minBufferTime= ... >
 <Period ... >
                   141
  <AdaptationSet ... width='480' height='270' ... >  (AdaptationSet ON Thumbnail Video)
   <ViewPoint schemeIdURI="urn:thumbnailVideo:dic" value=" X, Y, Z, ..." />
                                                                         201
   ...
  </AdaptationSet>
  ...
 </Period>
 ...
</MPD>
```

FIG. 25

```
<MPD ··profiles= ··· minBufferTime= ··· >
 <Period ··· >
                  141
  <AdaptationSet ··· width=' 480' height=' 270' ··· > (AdaptationSet ON Thumbnail Video)
   <ViewPoint schemeIdURI="urn:thumbnailVideo:dic" value="baseball, US, GA" /> ~211
   <ViewPoint schemeIdURI="urn:thumbnailVideo:JapaneseParameters" value="baseball, the United States of America, California" />
                                                                           212
   ...
  </AdaptationSet>
  ...
 </Period>
 ...
</MPD>
```

FIG. 26

```
<MPD …profiles= … minBufferTime= … >   141
<Period … >
<AdaptationSet … width='480' height='270' … >  (AdaptationSet ON Thumbnail Video)
<ViewPoint schemeIdURI=" http://baseballAuthority.com/thumbnailVideoGenre" value="baseball, majorLeague" />
                                                                                   221
    :
</AdaptationSet>
    :
</Period>
    :
</MPD>
```

TRANSMISSION APPARATUS, TRANSMISSION METHOD, RECEPTION APPARATUS, AND RECEPTION METHOD

CROSS-REFERENCE TO RELATED APPLICATIONS

This application is a continuation of U.S. application Ser. No. 15/030,539, filed on Apr. 19, 2016, which is a National Stage of PCT/JP2014/073352, filed on Sep. 4, 2014, which claims the benefit of priority from Japanese Patent No. 2013-224901, filed on Oct. 30, 2013, the entire contents of each of which are incorporated herein by reference.

TECHNICAL FIELD

The present technology relates to a transmission apparatus, a transmission method, a reception apparatus, and a reception method, and particularly relates to a transmission apparatus, a transmission method, a reception apparatus, and a reception method which can easily obtain, for example, a mosaic screen.

BACKGROUND ART

Recently, the mainstream of streaming services on the internet has been an over-the-top video (OTT-V). For example, moving picture experts group-dynamic adaptive streaming over a hypertext transfer protocol (HTTP) (MPEG-DASH) (hereinafter, also referred to as DASH) has become widespread as a fundamental technology of the OTT-V.

In the DASH, for example, a server which distributes a stream notifies a client which receives the stream of a media presentation description (MPD) as metadata including attribute information to optimally select streams having different characteristics from the same source, the client uses the MPD, and thus network environment adaptive streaming can be accomplished (for example, see Non Patent Document 1).

In other words, in the DASH, a server prepares, as content having the same contents, a plurality of streams having different image qualities or image sizes according to a communication environment of a distribution path or capability or a state of the client.

On the other hand, the client adaptively selects a stream, which can be received by the client among the plurality of streams prepared by the server and suitable for the capability (decoding capability and the like) of the client, and reproduces the stream.

In the DASH, metadata used for reproduction control of content, which is called as an MPD, is distributed from a server to a client so that the client can adaptively select and receive the stream.

In the MPD, a uniform resource locator (URL) as an address of a segment (media data such as audio/video/subtitle), into which the content is divided, and the like are described. The client transmits, based on the URL and the like described in the MPD, an HTTP request to a web server which is the distribution source of the content, receives and reproduces the segment which the web server distributes by unicast by in response to the HTTP request.

CITATION LIST

Non Patent Document

Non Patent Document 1: "Achieving Uninterrupted Video Streaming Using Existing Web Servers", Mitsuhiro HIRABAYASHI, NIKKEI ELECTRONICS Mar. 3, 2012.

SUMMARY OF THE INVENTION

Problems to be Solved by the Invention

Incidentally, when the client views content of, for example, live broadcasting, it is useful if a mosaic screen in which a plurality of contents of videos is arranged in lattice shape can be displayed and a user can watch the plurality of contents of videos displayed on the mosaic screen and select a channel (content) to be viewed.

However, information useful for a client to generate a mosaic screen has not been distributed in the current DASH, and it is difficult to easily obtain a mosaic screen.

The present technology is made in view of the situation and to easily obtain a mosaic screen.

Solutions to Problems

A first transmission apparatus of the present technology includes a distribution unit configured to distribute metadata of content, the metadata being described using an attribute and an attribute value and including signaling information indicating that a video is a thumbnail video suitable for constituting a mosaic screen, and the attribute indicating information to refer to a file including information to receive content supplied by a service.

A first transmission method of the present technology includes the step of distributing metadata of content, the metadata being described using an attribute and an attribute value and including signaling information indicating that a video is a thumbnail video suitable for constituting a mosaic screen, and the attribute indicating information to refer to a file including information to receive content supplied by a service.

In the first transmission apparatus and the transmission method of the present technology as described above, metadata of content is distributed, the metadata being described using an attribute and an attribute value and including signaling information indicating that a video is a thumbnail video suitable for constituting a mosaic screen, and the attribute indicating information to refer to a file including information to receive content supplied by a service.

A first reception apparatus of the present technology includes a reception unit configured to receive metadata of content, the metadata being described using an attribute and an attribute value and including signaling information indicating that a video is a thumbnail video suitable for constituting a mosaic screen, and the attribute indicating information to refer to a file including information to receive content supplied by a service.

A first reception method of the present technology includes the step of receiving metadata of content, the metadata being described using an attribute and an attribute value and including signaling information indicating that a video is a thumbnail video suitable for constituting a mosaic screen, and the attribute indicating information to refer to a file including information to receive content supplied by a service.

In the first reception apparatus and the reception method of the present technology as described above, metadata of content is received, the metadata being described using an attribute and an attribute value and including signaling information indicating that a video is a thumbnail video suitable for constituting a mosaic screen, and the attribute indicating information to refer to a file including information to receive content supplied by a service.

A second transmission apparatus of the present technology includes a distribution unit configured to distribute metadata of content, the metadata being described using an attribute and an attribute value and including signaling information indicating that a video is a thumbnail video suitable for constituting a mosaic screen, and information to refer to a user service description (USD).

A second transmission method of the present technology includes the step of distributing metadata of content, the metadata being described using an attribute and an attribute value and including signaling information indicating that a video is a thumbnail video suitable for constituting a mosaic screen, and information to refer to a user service description (USD).

In the second transmission apparatus and the transmission method of the present technology as described above, metadata of content is distributed, the metadata being described using an attribute and an attribute value and including signaling information indicating that a video is a thumbnail video suitable for constituting a mosaic screen, and information to refer to a user service description (USD).

A second reception apparatus of the present technology includes a reception unit configured to receive metadata of content, the metadata being described using an attribute and an attribute value and including signaling information indicating that a video is a thumbnail video suitable for constituting a mosaic screen, and information to refer to a user service description (USD).

A second reception method of the present technology includes the step of receiving metadata of content, the metadata being described using an attribute and an attribute value and including signaling information indicating that a video is a thumbnail video suitable for constituting a mosaic screen, and information to refer to a user service description (USD).

In the second reception apparatus and the reception method of the present technology as described above, metadata of content is received, the metadata being described using an attribute and an attribute value and including signaling information indicating that a video is a thumbnail video suitable for constituting a mosaic screen, and information to refer to a user service description (USD).

Note that, the transmission apparatus and the reception apparatus may be independent apparatuses or internal blocks constituting an apparatus.

Effects of the Invention

According to the present technology, a mosaic screen can be easily obtained.

Note that, effects are not necessarily limited to the effects described here and may be any one of the effects described in the present disclosure.

BRIEF DESCRIPTION OF DRAWINGS

FIG. 10 is a diagram illustrating examples of elements and attributes of XML which constitute a USD described in XML as thumbnail metadata.

FIG. 13 is a diagram illustrating examples of elements and attributes of XML which constitute an MPD described in XML as thumbnail metadata.

FIG. 14 is a diagram illustrating an example of an MPD described in XML as thumbnail metadata.

FIG. 15 is a diagram illustrating an example of a data model of an OMA-ESG as thumbnail metadata.

FIG. 16 is a diagram illustrating examples of elements and attributes of XML which constitute an OMA-ESG described in XML as thumbnail metadata.

FIG. 17 is a diagram illustrating an example of an OMA-ESG described in XML as thumbnail metadata.

FIG. 23 is a diagram illustrating a first example of an MPD introducing content description metadata as thumbnail metadata.

FIG. 25 is a diagram illustrating a second example of an MPD introducing content description metadata as thumbnail metadata.

FIG. 26 is a diagram illustrating a third example of an MPD introducing content description metadata as thumbnail metadata.

MODE FOR CARRYING OUT THE INVENTION

<An Embodiment of a Content Supply System Employing the Present Technology>

Figure 1:
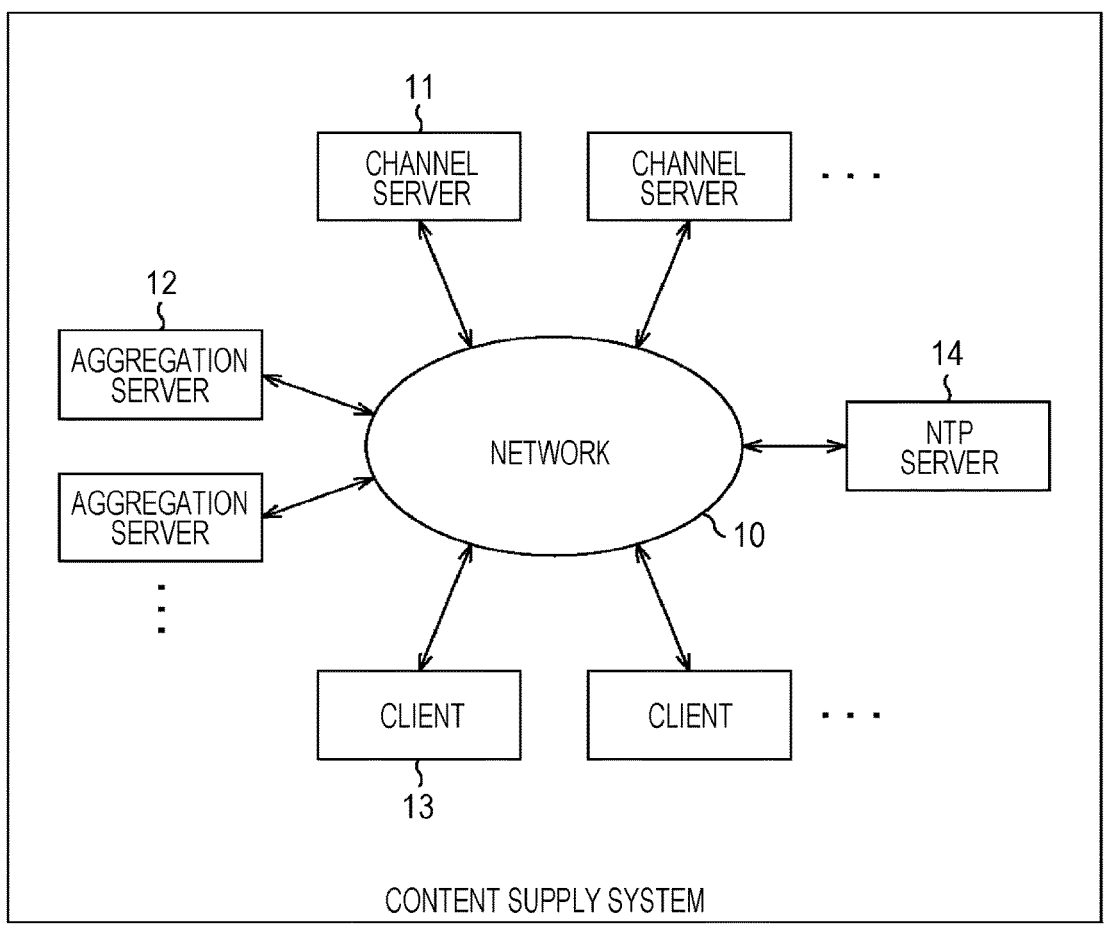
FIG. 1 is a block diagram illustrating a configuration example of an embodiment of a content supply system employing the present technology.

FIG. 1 is a block diagram illustrating a configuration example of an embodiment of a content supply system employing the present technology.

In FIG. 1, the content supply system is configured by connecting a plurality of channel servers 11, one or more aggregation servers 12, one or more clients 13, and a network time protocol (NTP) server 14 to a network 10.

In the content supply system of FIG. 1, content is supplied from the channel server 11 or the aggregation server 12 to the client 13 via the network 10 using the DASH.

Here, although it is based on the assumption that streaming itself is performed by unicast on the over-the-top/ contents delivery network (OTT/CDN) in the current DASH, videos constituting a mosaic screen are distributed on, for example, a quality-assured multicast network capable of simultaneous broadcasting on a mobile network (eMBMS or the like) in the content supply system of FIG. 1. Thus, it is possible to provide a number of users with operability having excellent performance to select a channel on a mosaic screen.

In other words, the content supply system of FIG. 1 enables the client 13 to easily efficiently generate (obtain) a mosaic screen by grouping (aggregating) and distributing a plurality of videos constituting the mosaic screen in one FLUTE multicast session and the like.

The network 10 contains a bidirectional network capable of unicasting or multicasting, such as the internet, and a broadcasting network capable of broadcasting or multicasting. The network 10 can employ, for example, the multimedia broadcast multicast service (MBMS) (including the evolved MBMS (eMBMS)) of the 3rd generation partnership project (3GPP).

The channel server 11 corresponds to, for example, a broadcasting station, and distributes a plurality of streams, which is a stream of content having the same contents and is different from each other in a bit rate, an image size, or the like, via the network 10 as a program of a channel (service) of the broadcasting station.

Here, the plurality of streams distributed by the channel server 11 includes an audiovisual stream, such as a main video, audio, and subtitles, and a stream of thumbnail video suitable for constituting a mosaic screen.

Here, the thumbnail video suitable for constituting a mosaic screen means a video which has the same contents of a main video and has a predetermined image size smaller than, for example, the main video, constituting a mosaic screen by tiling the videos in lattice shape on a display having a certain size.

The aggregation server 12 corresponds to, for example, a broadcasting station which broadcasts a mosaic screen as a program, groups (aggregates) and distributes a plurality of (streams of) the thumbnail videos distributed by the plurality of channel servers 11 via the network 10 as a program of the channel (service) of the broadcasting station.

The client 13 receives and reproduces the main video distributed by the channel server 11 and the thumbnail video distributed by the aggregation server 12.

The NIP server 14 supplies an NTP time, which is time information according to a coordinated universal time (UTC) format, via the network 10.

The channel server 11, the aggregation server 12, and the client 13 can operate in synchronization with the NTP time supplied from the NTP server 14.

Note that, the program distributed by the channel server 11 (and therefore the program distributed by the aggregation server 12) may be a real time program (live program) or a recorded program.

<Configuration Example of the Channel Server 11>

Figure 2:
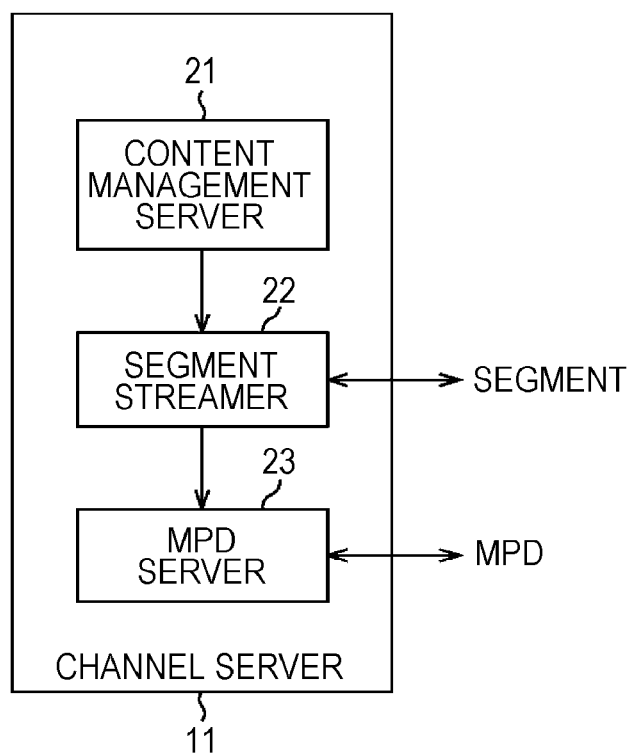
FIG. 2 is a block diagram illustrating a configuration example of a channel server 11.

FIG. 2 is a block diagram illustrating a configuration example of the channel server 11 of FIG. 1.

In FIG. 2, the channel server 11 includes a content management server 21, a segment streamer 22, and an MPD server 23.

Here, the content management server 21, the segment streamer 22, and the MPD server 23 may be arranged in one place on the network 10 or may be dispersedly arranged on the network 10. When the content management server 21, the segment streamer 22, and the MPD server 23 are dispersedly arranged on the network 10, the communication with each other can be performed via a dedicated line or other arbitrary communication lines in addition to the network 10.

The content management server 21 manages videos, audio, and subtitles as source data of content to be distributed as a program of a channel of the channel server 11, generates a plurality of pieces of streaming data having different bit rates from the video or the like as the source data of the content, and supplies the streaming data to the segment streamer 22.

Here, the plurality of pieces of streaming data of the video includes a main video and a thumbnail video.

The segment streamer 22 generates a segment stream of a segment into which each streaming data from the content management server 21 is divided in a time direction.

In other words, the segment streamer 22 divides the streaming data into, for example, fragments of fragmented MP4 (moof and mdat), collects one or more of the fragments, and generates a file of the segment.

Furthermore, the segment streamer 22 supplies, to the MPD server 23, the metadata of the segment necessary for generating the MPD, such as an URL of a segment (an URL of a server supplying the segment (for example, the channel server 11)).

Moreover, the segment streamer 22, as a web server, distributes by HTTP unicast, in response to an HTTP request which is a request of a segment from the client 13, (the file of) the segment requested by the HTTP request to the client 13 via the network 10.

The segment streamer 22 further distributes (by unicast or multicast) the segment of the thumbnail video to the aggregation server 12 via the network 10.

The MPD server 23 generates, using the metadata of the segment supplied from the segment streamer 22, an MPD in which the URL and the like of the segment necessary for the client 13 to receive and perform the reproduction control of the segment.

The MPD server 23, as a web server, distributes by HTTP unicast, in response to the HTTP request which is a request of an MPD from the client 13, the MPD to the client 13 via the network 10.

Furthermore, the MPD server 23 distributes (by unicast or multicast) the MPD of the thumbnail video to the aggregation server 12 via the network 10.

Here, the client 13 can receive, by requesting the MPD server 23 of an MPD, the MPD which the MPD server 23 distributes by HTTP unicast in response to the request.

Furthermore, the client 13 can receive, by requesting the segment streamer 22 of a segment based on the MPD from the MPD server 23, the segment which the segment streamer 22 distributes by HTTP unicast in response to the request, and reproduce the segment based on the MPD.

<Configuration Example of the Aggregation Server 12>

Figure 3:
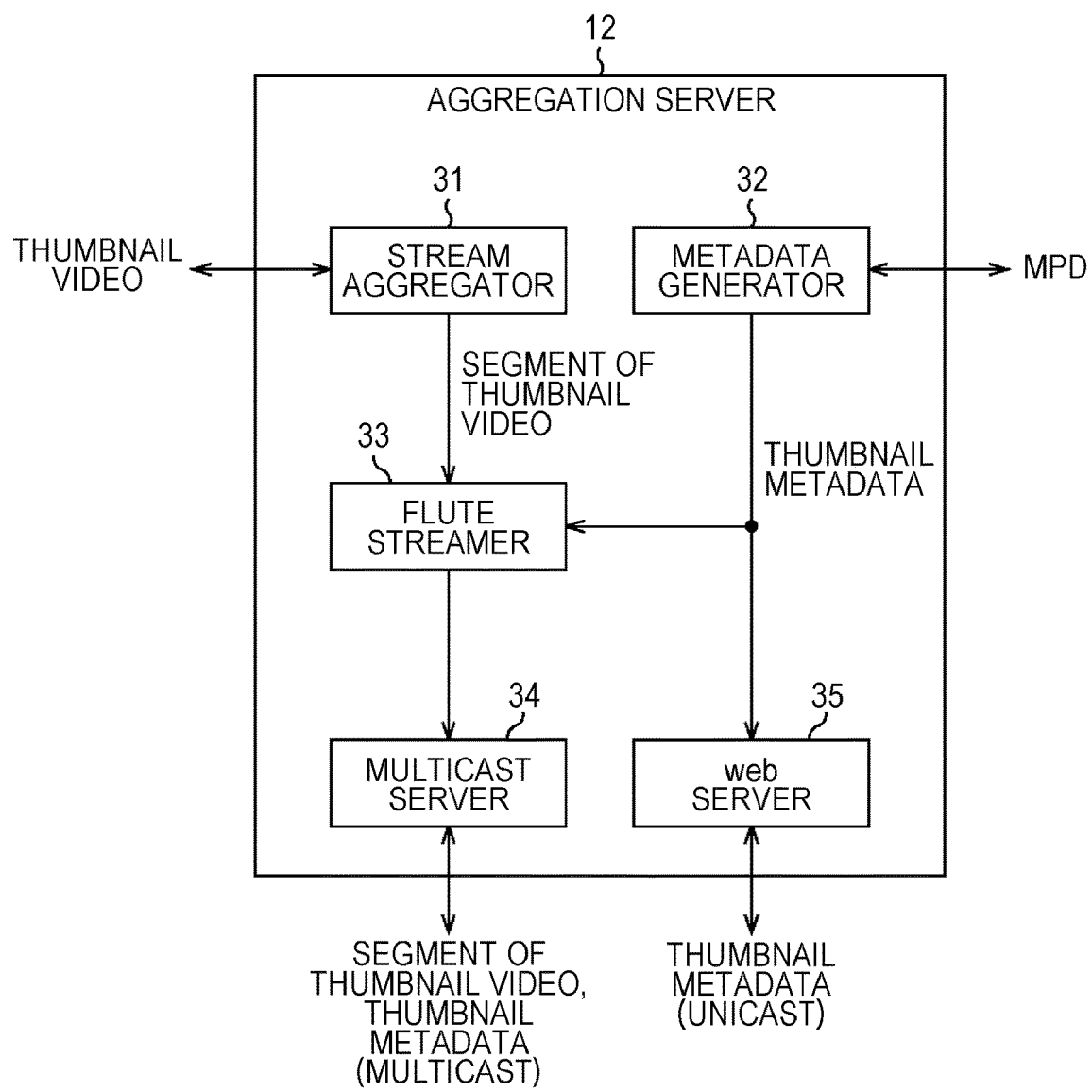
FIG. 3 is a block diagram illustrating a configuration example of an aggregation server 12.

FIG. 3 is a block diagram illustrating a configuration example of the aggregation server 12 of FIG. 1.

In FIG. 3, the aggregation server 12 includes a stream aggregator 31, a metadata generator 32, a file delivery over unidirectional transport (FLUTE) streamer 33, a multicast server 34, and a web server 35.

Here, the stream aggregator 31 to the web server 35 may be arranged in one place on the network 10, or may be dispersedly arranged on the network 10 similarly to the case of the channel server 11 of FIG. 2. When the stream aggregator 31 to the web server 35 are dispersedly arranged on the network 10, the communication with each other can be performed via a dedicated line or other arbitrary communication lines in addition to the network 10.

The stream aggregator 31 selects (aggregates), from (the segments of) the plurality of thumbnail videos to be distributed from the plurality of channel servers 11, two or more thumbnail videos to constitute a channel having a mosaic screen (hereinafter, also referred to as a mosaic channel) as thumbnail videos for a mosaic channel, and supplies the thumbnail videos to the FLUTE streamer 33.

Here, the stream aggregator 31 selects, from the plurality of thumbnail videos to be distributed from the plurality of channel servers 11, two or more thumbnail videos suitable for constituting a mosaic screen as thumbnail videos for a mosaic channel.

The two or more thumbnail videos suitable for constituting a mosaic screen are, for example, two or more thumbnail videos having, at least, the same image size.

In addition, on the conditions that, for example, the video has an image size suitable for being tiled in lattice shape on a display screen having a certain size or the video has the same genre such as baseball relay broadcasting, the stream aggregator 31 can select two or more thumbnail videos satisfying one or more of the conditions as thumbnail videos for a mosaic channel.

The metadata generator 32 selects the MPD for each of the two or more thumbnail videos selected by the stream aggregator 31 from the MPDs of the plurality of thumbnail videos to be distributed from the plurality of channel servers 11, and generates thumbnail metadata which is metadata for a mosaic channel using the MPD.

Then, the metadata generator 32 supplies the thumbnail metadata to the FLUTE streamer 33 and the web server 35.

Here, for example, a combination of a user service description (USD) of an MBMS, an MPD of the DASH, and a session description protocol (SDP) (file) of the internet engineering task force (IETF), or a combination of an open mobile alliance-electronic service guide (OMA-ESG), a USD, an MPD, and an SDP can be used as the thumbnail metadata.

An OMA-ESG, a USD, an MPD, and an SDP are each described using an attribute (name) and an attribute value set to the attribute. In addition, an attribute and an attribute value may be called as, for example, a key and a value.

The FLUTE streamer 33 stores (the segment of) the thumbnail video supplied from the stream aggregator 31 in a FLUTE packet, that is, in a layered coding transport (LCT) packet (asynchronous layered coding (ALC) packet), and supplies the packet to the multicast server 34.

Furthermore, the FLUTE streamer 33 stores the thumbnail metadata supplied from the metadata generator 32 in the LCT packet, and supplies the packet to the multicast server 34.

The multicast server 34 distributes by FLUTE multicast the LCT packet from the FLUTE streamer 33 via the network 10.

Here, in the LCT packet from the FLUTE streamer 33, (the segment of) the thumbnail video and the thumbnail metadata are stored as described above, and the multicast server 34 distributes by multicast the thumbnail video and the thumbnail metadata accordingly.

The web server 35 distributes by HTTP unicast, in response to the request (HTTP request) from the client 13, the thumbnail metadata from the metadata generator 32 to the client 13 via the network 10.

Here, the multicast server 34 and the web server 35 function as distribution units which distribute thumbnail metadata as described above.

Note that, the thumbnail video is distributed by multicast in the aggregation server 12 of FIG. 3 as described above, and in addition, (segments of) a main video, audio, subtitles, and the like of the content of the thumbnail video which are acquired from the channel server 11 can be distributed by multicast similarly to the thumbnail video in the aggregation server 12.

Furthermore, the channel server 11 can distribute by multicast a main video and the like as the aggregation server 12 distributes by multicast the thumbnail video.

Moreover, in the aggregation server 12, the multicast server 34 distributes by multicast the thumbnail video, and in addition, the web server 35 can distribute by unicast the thumbnail video.

<Configuration Example of the Client 13>

Figure 4:
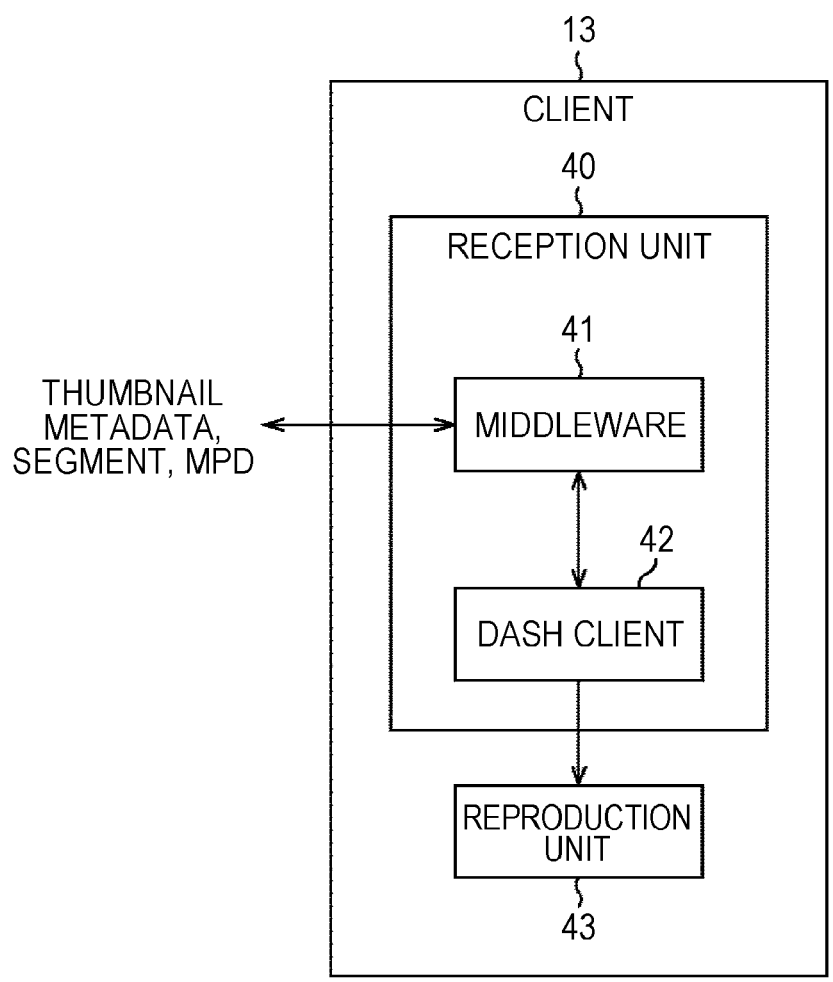
FIG. 4 is a block diagram illustrating a configuration example of a client 13.

FIG. 4 is a block diagram illustrating a configuration example of the client 13 of FIG. 1.

In FIG. 4, the client 13 includes a reception unit 40 and a reproduction unit 43.

The reception unit 40 functions as a reception unit which receives the MPD distributed from the channel server 11 or the thumbnail metadata to be distributed from the aggregation server 12 in response to, for example, a user's operation of the client 13.

Furthermore, the reception unit 40 receives, based on the MPD received from the channel server 11 or the thumbnail metadata received from the aggregation server 12 in response to, for example, a user's operation of the client 13, the segment (of the main video and the like) to be distributed from the channel server 11 or the segment (of the thumbnail video and the like) to be distributed by multicast from the aggregation server 12.

Moreover, the reception unit 40 supplies the segment received from the channel server 11 or the aggregation server 12 to the reproduction unit 43, and controls the reproduction of the segment at the reproduction unit 43 based on the MPD received from the channel server 11 or the thumbnail metadata received from the aggregation server 12.

The reproduction unit 43 reproduces, under the control of the reception unit 40, the segment supplied from the reception unit 40, that is, a mosaic screen constituted of thumbnail videos, a main video, audio, subtitles, and the like.

Here, the reception unit 40 includes middleware 41 and a DASH client 42.

The DASH client 42 outputs, as needed, an HTTP request which requests a segment of an MPD, a thumbnail video, a main video, or the like to the middleware 41.

The middleware 41 receives, as needed, an MPD, a thumbnail metadata, or a segment which are distributed by multicast, and when the DASH client 42 outputs an HTTP request, the middleware 41 determines whether the MPD or the segment requested by the HTTP request has been distributed by multicast based on the thumbnail metadata or the like.

Then, when the MPD or the segment requested by the HTTP request output by the DASH client 42 has been distributed by multicast, the middleware 41 receives the MPD or the segment to be distributed by multicast and supplies the MPD or the segment to the DASH client 42.

Note that, when the MPD or the segment requested by the HTTP request output by the DASH client 42 has been received, the middleware 41 supplies the received MPD or segment to the DASH client 42.

On the other hand, when the MPD or the segment requested by the HTTP request output by the DASH client 42 has not been distributed by multicast, the middleware 41 directly transmits the HTTP request output by the DASH client 42 to the network 10. Then, the middleware 41 receives, in response to the HTTP request, the MPD or the segment distributed by unicast, and supplies the MPD or the segment to the DASH client 42.

Thus, the DASH client 42 outputs, similarly to a common DASH client, an HTTP request which requests a necessary MPD or segment, receives and processes the MPD or the segment supplied from the middleware 41 in response to the HTTP request.

<Process by the Content Supply System>

Figure 5:
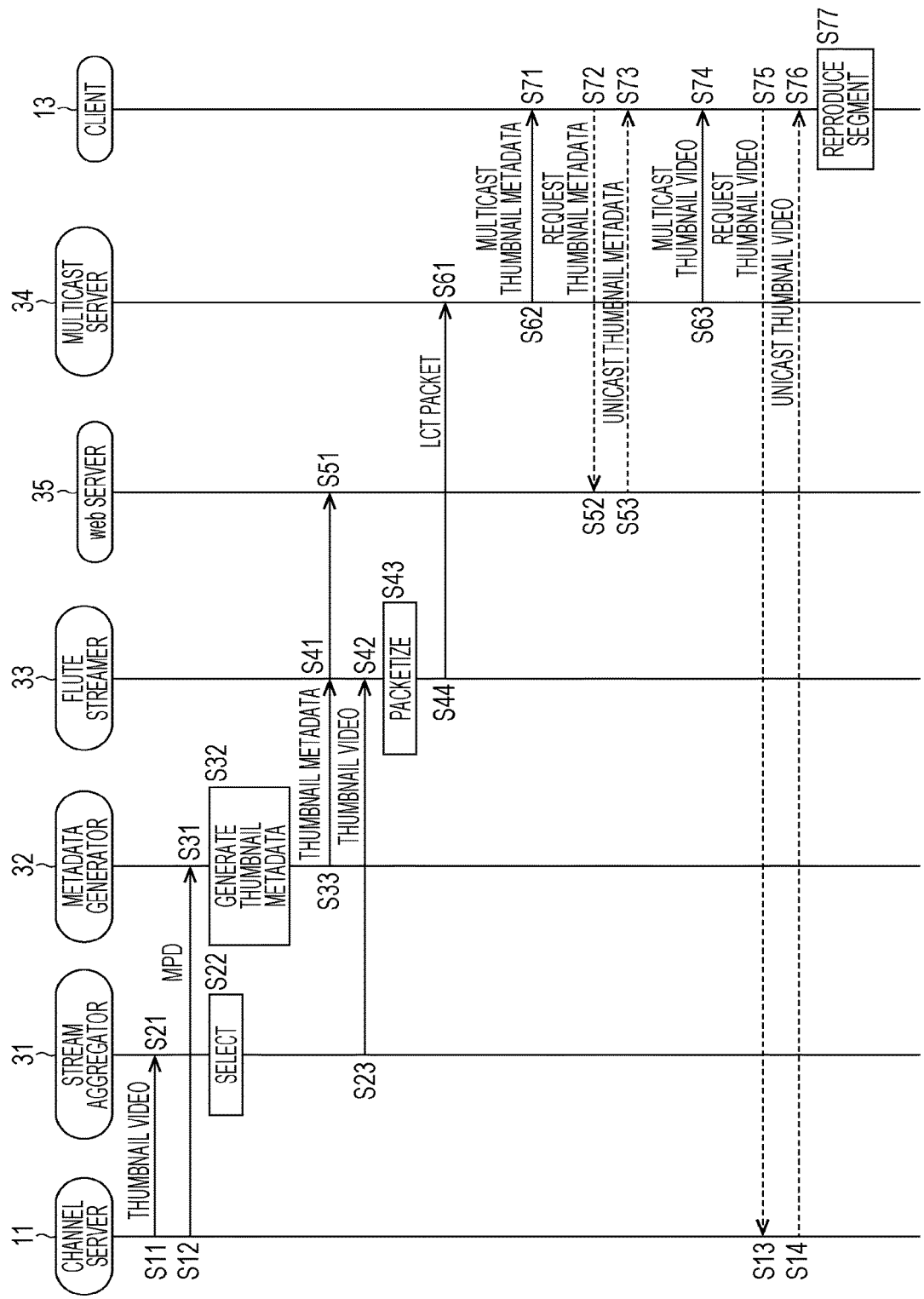
FIG. 5 is a diagram for explaining a thumbnail video supplying process by the content supply system.

FIG. 5 is a diagram for explaining an example of a thumbnail video supplying process by the content supply system of FIG. 1.

The channel server 11 distributes, in step S11, a thumbnail video to the stream aggregator 31 of the aggregation server 12 (FIG. 3).

The channel server 11 further distributes, in step S12, the MPD of the thumbnail video to the metadata generator 32 of the aggregation server 12.

Furthermore, in step S13, when an HTTP request which requests a thumbnail video is transmitted from the client 13, the channel server 11 receives the HTTP request.

Then, in step S14, the channel server 11 distributes by unicast, to the client 13, (the segment of) the thumbnail video requested by the HTTP request from the client 13.

The stream aggregator 31 of the aggregation server 12 (FIG. 3) receives, in step S21, the thumbnail videos distributed by the plurality of channel servers 11 in step S11.

Then, the stream aggregator 31 selects, in step S22, two or more thumbnail videos to constitute a mosaic channel from the plurality of thumbnail videos received from the plurality of channel servers 11, and supplies the thumbnail videos to the FLUTE streamer 33 in step S23.

The metadata generator 32 of the aggregation server 12 receives, in step S31, the MPDs of the thumbnail videos distributed by the plurality of channel servers 11 in step S12.

Then, the metadata generator 32 selects, in step S32, the MPD for each of the two or more thumbnail videos selected by the stream aggregator 31 from the MPDs of the plurality of thumbnail videos received from the plurality of channel servers 11, and generates thumbnail metadata using the MPD. Furthermore, the metadata generator 32 supplies, in step S33, the thumbnail metadata to the FLUTE streamer 33 and the web server 35.

The FLUTE streamer 33 of the aggregation server 12 receives, in step S41, the thumbnail metadata distributed from the metadata generator 32 in step S33.

Furthermore, the FLUTE streamer 33 receives, in step S42, (the segments of) the thumbnail video supplied from the stream aggregator 31 in step S23.

The FLUTE streamer 33 packetizes, in step S43, the thumbnail metadata from the metadata generator 32 or the thumbnail video from the stream aggregator 31 by storing the thumbnail metadata or the thumbnail video in an LCT packet, and supplies the thumbnail metadata or the thumbnail video to the multicast server 34 in step S44.

The web server 35 of the aggregation server 12 receives, in step S51, the thumbnail metadata supplied from the metadata generator 32 in step S33.

Furthermore, in step S52, when an HTTP request which requests a thumbnail metadata is transmitted from the client 13, the web server 35 receives the HTTP request.

Then, in step S53, the web server 35 distributes by unicast, to the client 13, the thumbnail metadata requested by the HTTP request from the client 13.

The multicast server 34 of the aggregation server 12 receives, in step S61, the LCT packet supplied from the FLUTE streamer 33 in step S44.

Then, in step S62, the multicast server 34 distributes by multicast the LCT packet in which the thumbnail metadata from the FLUTE streamer 33 is stored.

Furthermore, in step S63, the multicast server 34 distributes by multicast the LCT packet in which the thumbnail video from the FLUTE streamer 33 is arranged.

At the client 13 (FIG. 4), the reception unit 40 receives, in step S71, (the LCT packet of) thumbnail metadata which the multicast server 34 distributes by multicast in step S62.

Alternatively, at the client 13, the reception unit 40 transmits, in step S72, an HTTP request which requests thumbnail metadata.

The HTTP request transmitted by the client 13 in step S72 is received by the web server 35 in step S52, and the thumbnail metadata requested by the HTTP request in step S53 is distributed by unicast to the client 13 as described above.

The reception unit 40 of the client 13 receives, in step S73, the thumbnail metadata distributed by unicast in the above manner.

Then, the reception unit 40 of the client 13 receives, in step S74, (the LCT packet of) the thumbnail video, which the multicast server 34 distributes by multicast in step S63, based on the thumbnail metadata.

Alternatively, at the client 13, the reception unit 40 transmits, in step S75, an HTTP request which request a thumbnail video based on the thumbnail metadata.

The HTTP request transmitted by the client 13 in step S75 is, as described above, received by the channel server 11 in step S13, and the thumbnail video requested by the HTTP request is distributed by unicast to the client 13 in step S14.

The reception unit 40 of the client 13 receives, in step S76, the thumbnail video distributed by unicast in the above manner.

Then, the reproduction unit 43 of the client 13 reproduces, in step S77, (the plurality of) the thumbnail videos received by the reception unit 40 in step S74 or S76, and displays a mosaic screen in which the thumbnail videos are arrange in lattice shape.

A user of the client 13 can easily select, by watching the mosaic screen, a channel corresponding to the thumbnail video constituting the mosaic screen as a viewing target.

<Explanation of the Data to be Distributed Via the Network 10>

Figure 6:
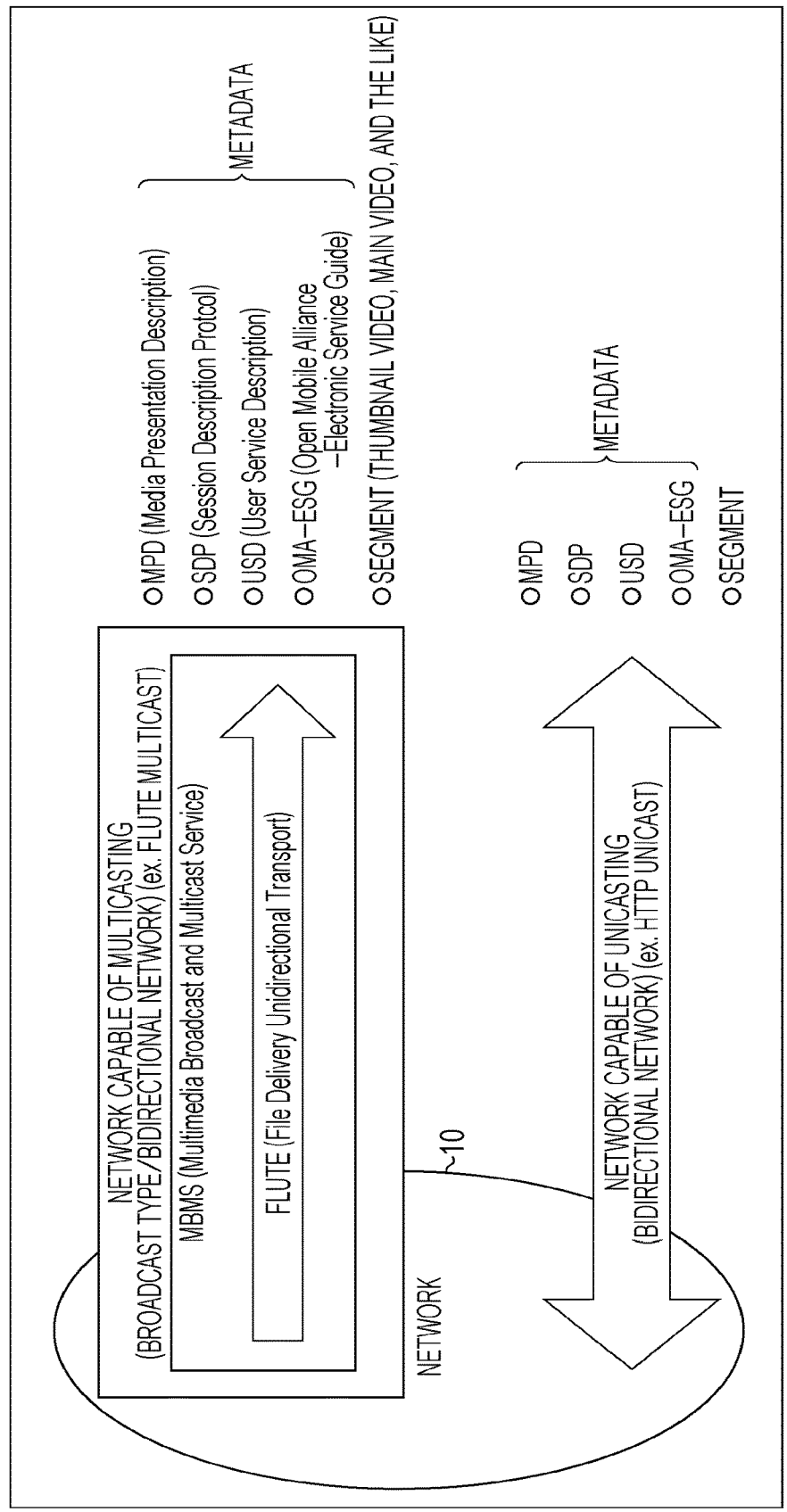
FIG. 6 is a diagram illustrating examples of data to be distributed via a network 10 in the content supply system.

FIG. 6 is a diagram illustrating examples of data to be distributed via a network 10 in the content supply system of FIG. 1.

In the content supply system, metadata, such as an MPD, an SDP, a USD, and an OMA-ESG, and a segment, such as a thumbnail video or a main video, are to be distributed to the client 13.

The metadata and the segment may be distributed by multicast and may be distributed by unicast.

As the thumbnail metadata, a combination of an MPD, an SDP, and a USD, or a combination of an OMA-ESG in addition to them.

Figure 7:
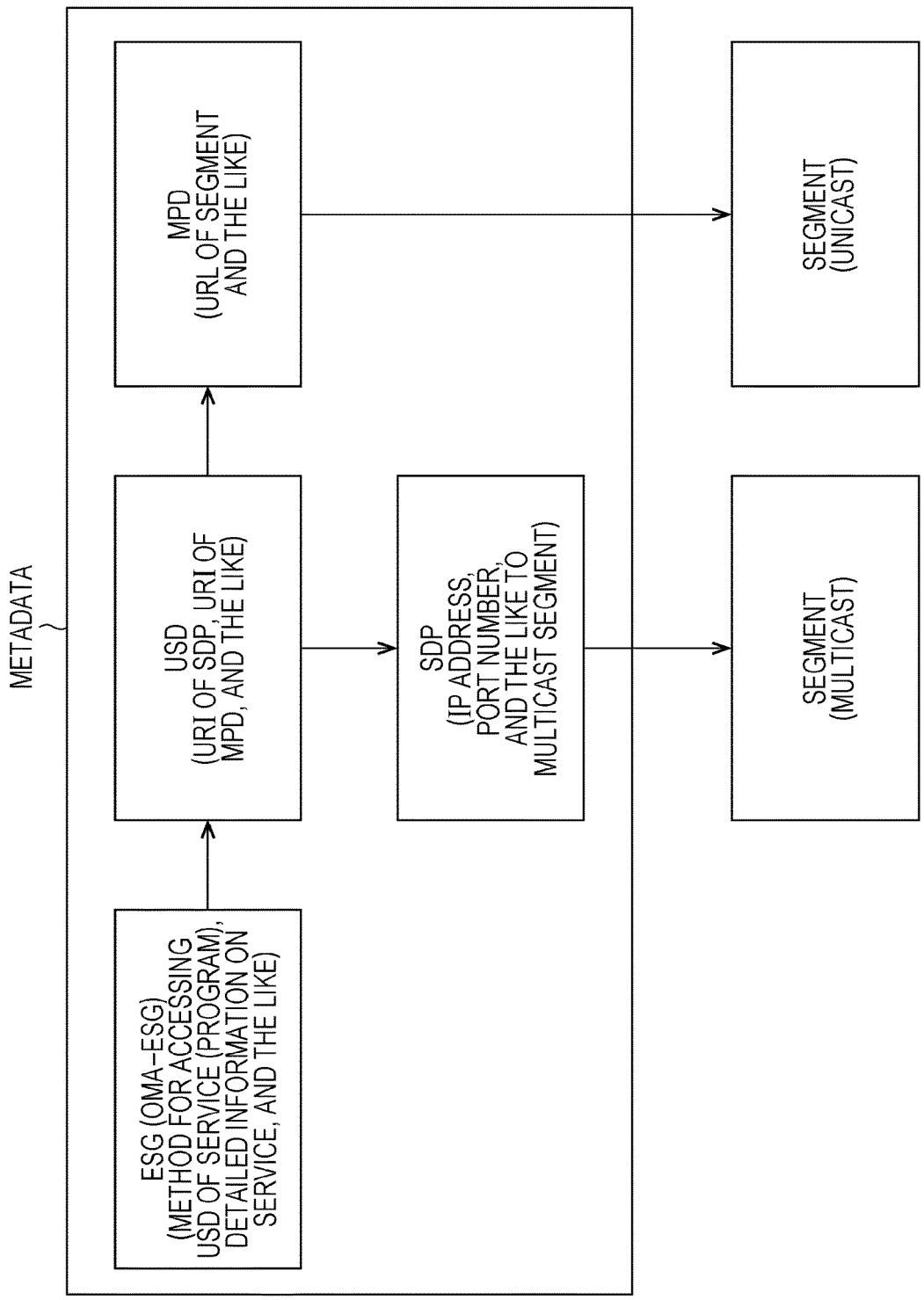
FIG. 7 is a diagram for explaining an MPD, an SDP, a USD, and an OMA-ESG.

FIG. 7 is a diagram for explaining an MPD, an SDP, a USD, and an OMA-ESG.

Now, it is assumed that a program is to be a focused program which is focused, detailed information on the focused program or a method for accessing the USD of the focused program is described in the OMA-ESG of the focused program.

Thus, when the OMA-ESG of the focused program is acquired, it is possible to acquire the USD of the focused program by referring to the method for accessing to the USD described in the OMA-ESG.

In the USD of the focused program, the uniform resource identifier (URI) of the SDP of the focused program, the URI of the MPD of the focused program, and the like are described.

Thus, when the USD of the focused program is acquired, it is possible to acquire the SDP an MPD of the focused program by referring to the URI of the SDP and the MPD described in the USD.

In the SDP of the focused program, a transport attribute and the like, such as an IP address and a port number to distribute by multicast the segment of the focused program, are described.

Thus, by acquiring the SDP of the focused program, it is possible to receive, based on the IP address and the port number described in the SDP, the segment of the focused program distributed by multicast.

In the MPD of the focused program, the URL of the segment of the focused program, information necessary for the reproduction control of the segment, and the like are described.

Thus, by acquiring the MPD of the focused program, it is possible to receive by unicast, based on the URL described in the MPD, the segment of the focused program. Furthermore, it is possible to reproduce, based on the MPD of the focused program, the segment of the focused program.

In other words, since the MPD includes the information necessary for the reproduction control of the segment, the MPD is needed to receive by unicast the segment and is also needed to reproduce the segment.

<Announce of a Thumbnail Video>

In order for the client 13 (FIG. 1) to receive a thumbnail video and constitute a mosaic screen constituted of a plurality of thumbnail videos, it is necessary for the client 13 to know (recognize) which video is the thumbnail video.

Thus, in the content supply system of FIG. 1, in order for the client 13 to know which video is the thumbnail video, the aggregation server 12 announces the thumbnail video.

The announce of the thumbnail video is performed by distributing thumbnail metadata including thumbnail signaling information indicating that a video is the thumbnail video.

Here, the thumbnail signaling information can be included in a USD, an MPD, or an OMA-ESG as thumbnail metadata.

At the aggregation server 12, the thumbnail metadata including the thumbnail signaling information can be distributed via, for example, an interaction channel of the MBMS (unicast on a bidirectional (ptp: point to point) bearer) or a broadcast multicast channel (broad/multicast on unidirectional (ptm: point to multi-point) bearer).

In other words, at the aggregation server 12, the thumbnail metadata can be distributed, as described in FIG. 3, by FLUTE multicast (on a broadcasting network (including a multicast network on a bidirectional network)) or by HTTP unicast (on a bidirectional network).

The case where a thumbnail metadata is distributed using an MBMS which is a mobile broadcasting system on a mobile network will be described below.

Figure 8:
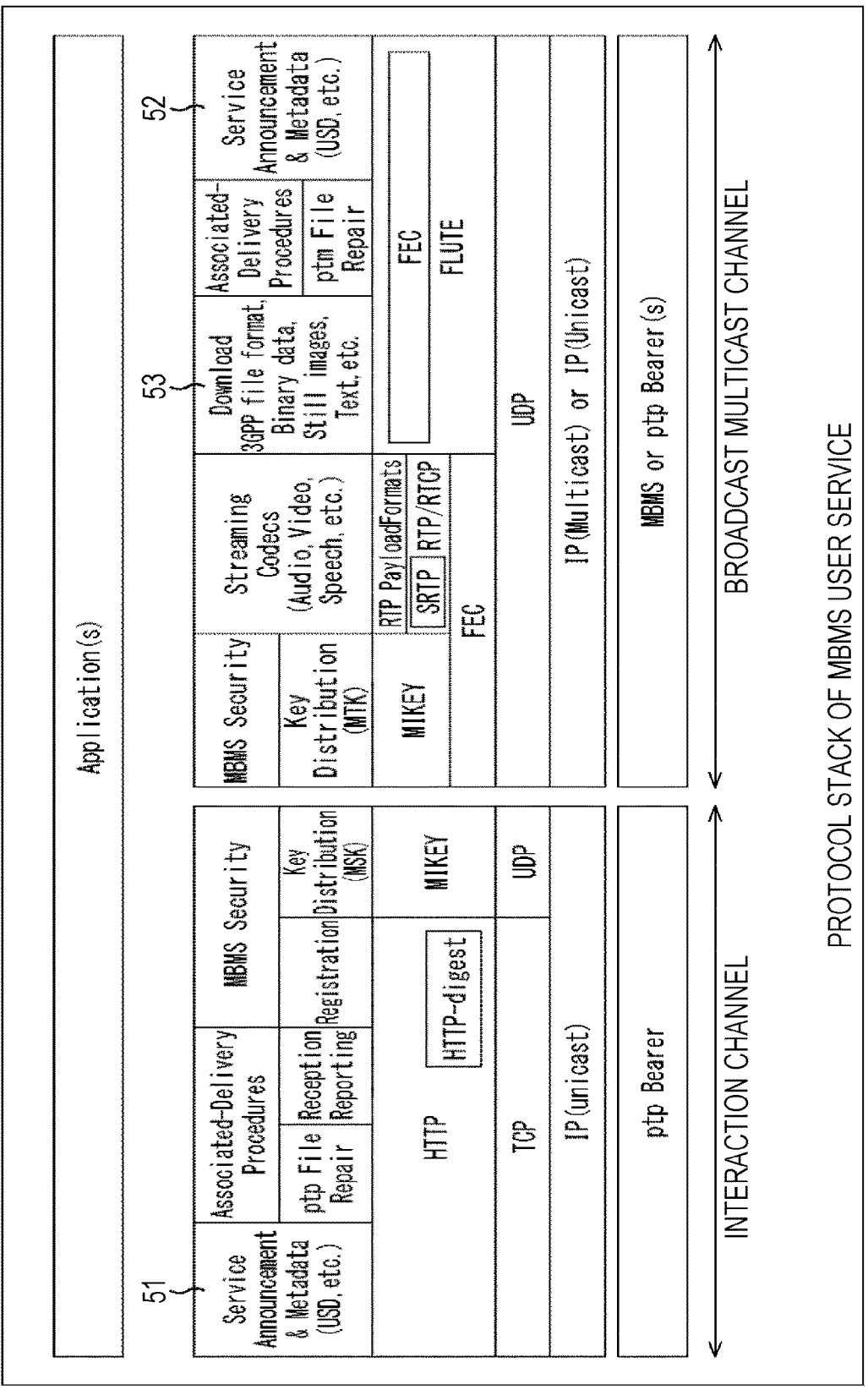
FIG. 8 is a diagram illustrating a protocol stack of an MBMS.

FIG. 8 is a diagram illustrating a protocol stack of an MBMS.

The MBMS includes an interaction channel for a bidirectional communication and a broadcast multicast channel for a unidirectional communication.

The interaction channel of the MBMS is used to distribute by HTTP unicast metadata, such as a segment and an MPD (including an MPD as thumbnail metadata). The broadcast multicast channel of the MBMS is used to distribute by FLUTE multicast metadata, such as a segment and an MPD.

Any of an MPD as thumbnail metadata, a USD, an MPD, and an OMA-ESG can be distributed as Service Announcement&Metadata 51 of an interaction channel or as Service Announcement&Metadata 52 of a broadcast multicast channel.

Note that, when a segment is distributed by multicast, the segment is distributed by FLUTE multicast as Download 3GPP file format, Binary data, Still images, Text, etc. 53 of the broadcast multicast channel.

<A USD as Thumbnail Metadata>

Figure 9:
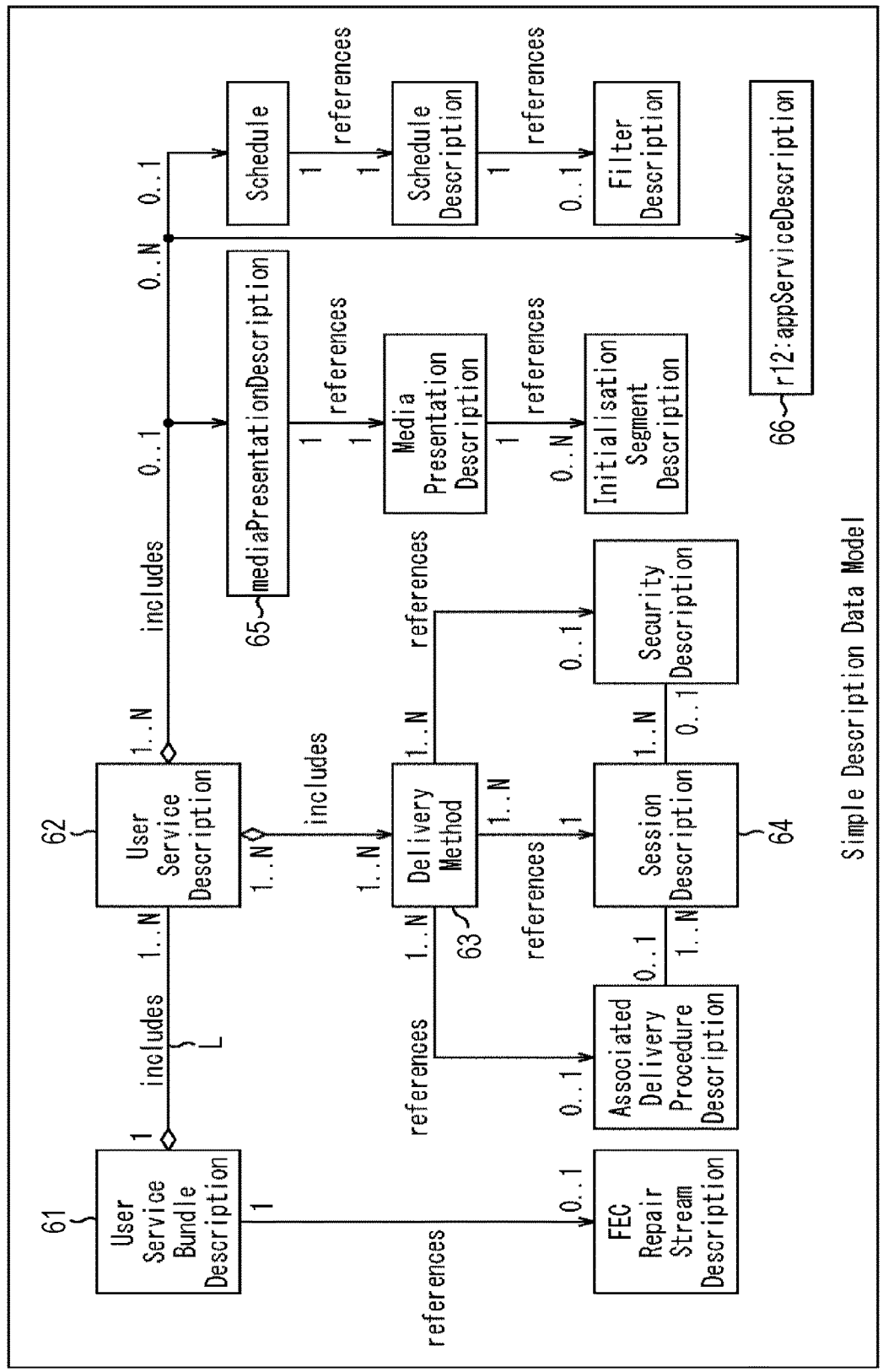
FIG. 9 is a diagram illustrating an example of a data model of a USD as thumbnail metadata.

FIG. 9 is a diagram illustrating an example of a data model of a USD as thumbnail metadata.

In the data model of the thumbnail metadata of FIG. 9, an r12:appServiceDescription (element) 66 is newly introduced to the data model of the USD of the MBMS.

In FIG. 9, a User Service Bundle Description 61 is a root element, and a User Service Description 62 is information about a service. Delivery Method 63 is information about a method for distributing a segment, and includes a URI and the like of a Session Description 64 indicating an SDP. The Session Description 64 indicates an SDP, and a media Presentation Description 65 indicates an MPD.

The r12:appServiceDescription 66 is information to signal the client 13 as to whether (a segment of) content supplied by a service (broadcasting station) (channel) is to be distributed by multicast (or to be distributed by broadcast) or to be distributed by unicast.

Here, in FIG. 9, for example, a description "1 . . . N" at the User Service Description 62 side of a link (line) L connecting the User Service Bundle Description 61 and the User Service Description 62 indicates that the User Service Bundle Description 61 at the opposite side of the link L to the description "1 . . . N" contains (or refers to) the number in the range from one to N of the User Service Descriptions 62.

Furthermore, a description "1" at the User Service Bundle Description 61 side of the link L indicates that the User Service Description 62 at the opposite side of the link L to the description "1" is contained in (or referred by) a User Service Bundle Description 61.

These are similarly applied to FIG. 15 to be described later.

FIG. 10 is a diagram illustrating examples of an element and an attribute of an extensible markup language (XML) which constitute a USD described in XML as thumbnail metadata.

A USD includes bundleDescription (element), bundleDescription/UserServiceDescription (element), bundleDescription/userServiceDescription/@serviceId (attribute), bundleDescription/userServiceDescription/DeliveryMethod (element), and bundleDescription/userServiceDescription/DeliveryMethod/@sessionDescriptionURI (attribute).

Here, for example, the bundleDescription/UserServiceDescription indicates that UserServiceDescription (element) is an element contained in the bundleDescription (element), and hereinafter is also referred to as UserServiceDescription or /UserServiceDescription.

Furthermore, for example, the bundleDescription/userServiceDescription/@serviceId indicates that serviceId is an attribute belonging to the /userServiceDescription, and hereinafter is also referred to as serviceId or /@serviceId.

A bundleDescription element is information on a collection of one or more services, and a UserServiceDescription element is information on an individual service. A serviceId attribute is a service identifier to identify a service, and a DeliveryMethod element is information on a method for distributing content supplied by a service.

A sessionDescriptionURI attribute indicates information to refer to a file including information to receive content supplied by a service.

As a file including information to receive content supplied by a service, for example, an SDP (file) is adopted.

When an SDP is adopted as a file including information to receive content supplied by a service and the content is distributed by multicast, information including the IP address and the port number of the multicast is adopted as information to receive content supplied by a service. Furthermore, to the sessionDescriptionURI attribute indicating information to refer to an SDP, the URI and the like of the SDP is set as an attribute value.

An USD as thumbnail metadata includes the thumbnail signaling information in addition to the above bundleDescription element, UserServiceDescription element, serviceId attribute, DeliveryMethod element, and sessionDescriptionURI attribute.

Note that, as thumbnail metadata, instead of the above bundleDescription element, UserServiceDescription element, serviceId attribute, DeliveryMethod element, sessionDescriptionURI attribute, and USD including the thumbnail signaling information, arbitrary metadata including the thumbnail signaling information and information equivalent to one or more of the bundleDescription element, the UserServiceDescription element, the serviceId attribute, the DeliveryMethod element, and the sessionDescriptionURI attribute can be adopted.

Figure 11:
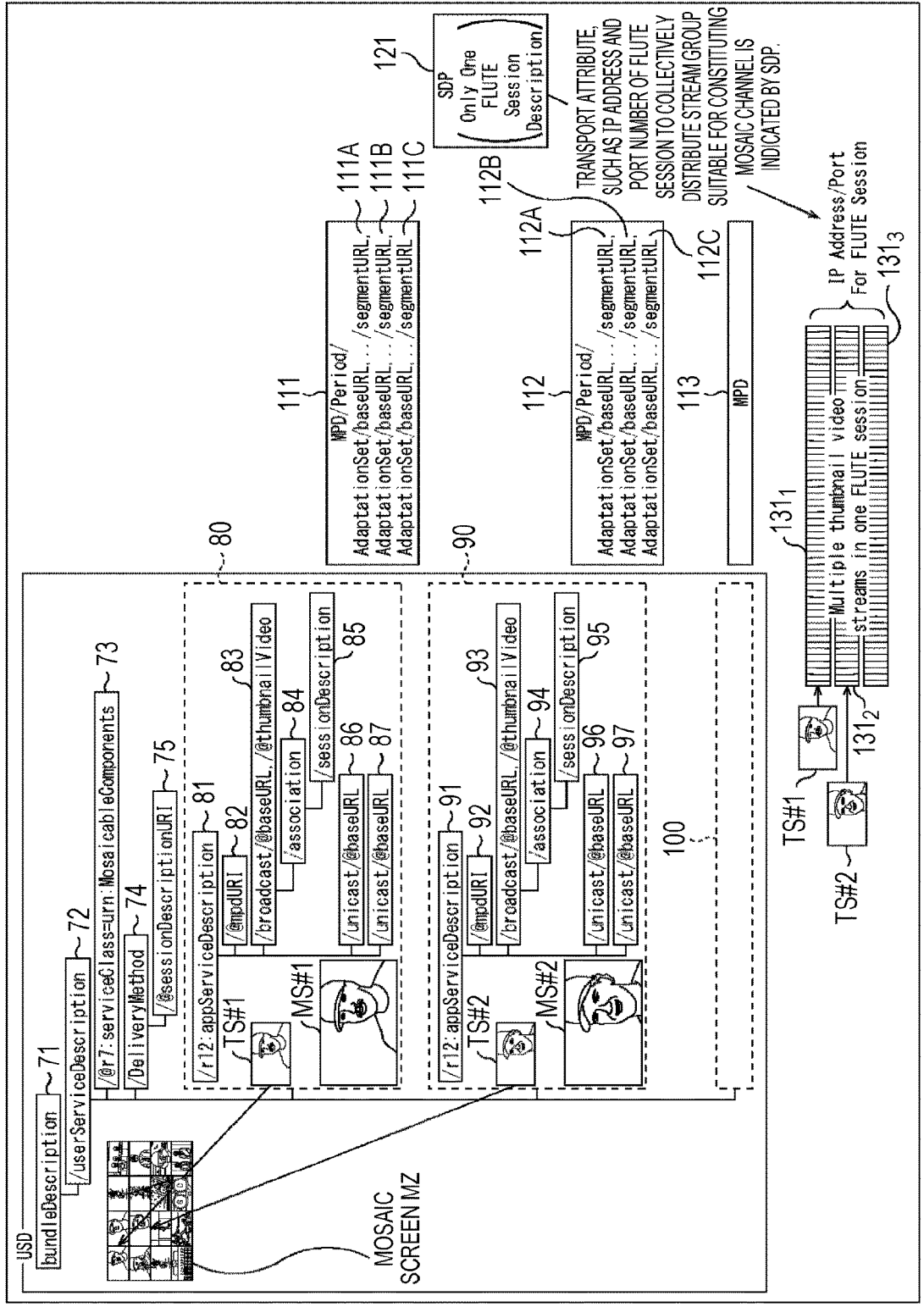
FIG. 11 is a diagram illustrating an example of an USD described in XML as thumbnail metadata.

FIG. 11 is a diagram illustrating an example of an USD described in XML as thumbnail metadata.

A BundleDescription element 71 is equivalent to the User Service Bundle Description 61 of FIG. 9 and is a root element of the USD.

A UserServiceDescription element 72 is equivalent to the User Service Description 62 of FIG. 9. The UserServiceDescription element 72 is contained in the bundleDescription element 71 and is equivalent to an individual service.

A /@r7:serviceClass attribute 73 belongs to the UserServiceDescription element 72. Here, "r7" in the /@r7:serviceClass attribute 73 indicates that the /@r7:serviceClass attribute 73 is introduced in release 7 of the 3GPP specifications.

With regard to the USD as thumbnail metadata, "urn:MosaicableComponents" is newly adopted as a scheme identifier (class name of serviceClass) as the attribute value of the /@r7:serviceClass attribute 73.

The new attribute value "urn:MosaicableComponents" indicates that the service (channel) which distributes the video corresponding to the USD describing the /@r7:serviceClass attribute 73 to which the attribute value "urn:MosaicableComponents" is set (the video whose information is described in the USD) is a service which distributes (a video including) a thumbnail video suitable for constituting a mosaic screen.

Thus, the /@r7:serviceClass attribute 73 to which the attribute value "urn:MosaicableComponents" is set functions as the thumbnail signaling information indicating that a video is the thumbnail video (serves as the thumbnail signaling information).

Note that, in the USD of FIG. 11, a /@thumbnailVideo attribute, which will be described later, in addition to the /@r7:serviceClass attribute 73 also functions as the thumbnail signaling information. Thus, the /@r7:serviceClass attribute 73 as the thumbnail signaling information can be omitted.

A /DeliveryMethod element 74 is equivalent to the Delivery Method 63 of FIG. 9 and includes a /@sessionDescriptionURI attribute 75.

To the /@sessionDescriptionURI attribute 75, a URI of an SDP 121 (information to refer to the SDP 121) describing an IP address and a port number of multicast is set in order to receive the content supplied by the service whose information is described in the USD including the /@sessionDescriptionURI attribute 75.

Each of descriptions 80, 90, and 100 is a description in which the /r12:appServiceDescription element is the highest (hierarchy) element, and is the information on the content which is capable constituting a mosaic screen MZ and supplied by a different service (channel) (broadcasting station).

Thus, the USD includes the /r12:appServiceDescription element of each of the contents capable of constituting a mosaic screen.

Here, the descriptions 80, 90, and 100 are the information on the content supplied by service ch#1, ch#2, and ch#3 respectively.

The description 80 includes a /r12:appServiceDescription element 81 contained in /the UserServiceDescription element 72. The /r12:appServiceDescription element 81 is information to signal the client 13 as to whether (a segment of) content supplied by the service ch#1 is to be distributed by multicast (or to be distributed by broadcast) or to be distributed by unicast.

The /r12:appServiceDescription element 81 includes a /@mpdURI attribute, and further includes (contains) either or both of one or more /broadcast elements or/and one or more /unicast elements.

Here, a URI of an MPD is set to the /@mpdURI attribute in order for the /r12:appServiceDescription element including the /@mpdURI attribute to perform the reproduction control of content indicating a distribution method.

The /broadcast element includes a baseURL attribute indicating a URL of content whose distribution method is indicated by the /r12:appServiceDescription element including the /broadcast element, and indicates that the content whose URL is indicated by the baseURL attribute is to be distributed by multicast.

The /unicast element includes a baseURL attribute indicating a URL of content whose distribution method is indicated by the /r12:appServiceDescription element including the /unicast element, and indicates that the content whose URL is indicated by the baseURL attribute is to be distributed by unicast.

In FIG. 11, the /r12:appServiceDescription element 81 in the description 80 includes a /@mpdURI attribute 82, and further includes a /broadcast element 83 and two /unicast elements 86 and 87.

The /r12:appServiceDescription element 81 includes the /broadcast element 83 and the two /unicast elements 86 and 87, and thus it is possible to recognize that there is a stream to be distributed by multicast and there are two streams to be distributed by unicast as (the stream of) the content of the service ch#1 whose distribution method is indicated by the /r12:appServiceDescription element 81.

To the /@mpdURI attribute 82, a URI of an MPD 111 of content supplied by the service ch#1 is set.

The /broadcast element 83 indicates that a stream $131_1$ of content supplied by the service ch#1 is to be distributed by multicast, and includes a /@baseURL attribute and a /@thumbnailVideo attribute in FIG. 11

To the /@baseURL attribute included in the /broadcast element 83, the URL of the stream $131_1$ of the content indicating that the /broadcast element 83 is to be distributed by multicast, that is, AdaptasionSet/baseURL 111A of the stream $131_1$ described in the MPD 111 of the content of the service ch#1 indicating that the /broadcast element 83 is to be distributed by multicast is set.

The /@thumbnailVideo attribute included in the /broadcast element 83 is a boolean type attribute, and functions as the thumbnail signaling information indicating whether the stream $131_1$ of the content indicating that the /broadcast element 83 is to be distributed by multicast is (the stream of) the thumbnail video.

In FIG. 11, the stream $131_1$ is a stream of a thumbnail video TS#1.

The /broadcast element 83 further includes a /association element 84, and the /association element 84 includes a /sessionDescription element 85.

The /sessionDescription element 85 indicates the URI of the SDP 121 describing the IP address and the port number to which the stream $131_1$, of the content indicating that the /broadcast element 83 is to be distributed by multicast, is to be distributed by multicast. In other words, the /sessionDescription element 85 indicates the same SDP 121 as (the URI of) the SDP 121 indicated by the /@sessionDescriptionURI attribute 75.

The /unicast element 86 indicates that another stream (for example, a stream of a main video MS#1) of content supplied by the service ch#1 is to be distributed by unicast, and includes the /@baseURL attribute.

To the /@baseURL attribute included in the /unicast element 86, the URL of another stream of the content indicating that the /unicast element 86 is to be distributed by unicast, that is, AdaptasionSet/baseURL 111B of another stream described in the MPD 111 of the content indicating that the /unicast element 86 is to be distributed by unicast is set.

The /unicast element 87 indicates that other stream (for example, a stream of audio) of content supplied by the service ch#1 is to be distributed by unicast, and includes the /@baseURL attribute.

To the /@baseURL attribute included in the /unicast element 87, the URL of other stream of the content indicating that the /unicast element 87 is to be distributed by unicast, that is, AdaptasionSet/baseURL 111C of other stream described in the MPD 111 of the content indicating that the /unicast element 87 is to be distributed by unicast is set.

In each of the descriptions 90 and 100 in the services ch#1 and ch#2, information similar to the description 80 is included.

Here, in FIG. 11, a /r12:appServiceDescription element 91 to a /unicast element 97 are similar information on the /r12:appServiceDescription element 81 to the /unicast element 87 respectively.

Furthermore, MPDs 112 and 113 are the MPDs of the contents supplied by the services ch#2 and ch#3 respectively.

In the service ch#2 (similarly in the services ch#1 and ch#3), (a stream of) a thumbnail video TS#2 is to be distributed by multicast, and (streams of) a main video MS#2 and audio are to be distributed by unicast. In the MPD112, the AdaptasionSet/baseURLs (and the segmentURLs) of them, that is, AdaptasionSet/baseURL 112A of the thumbnail video TS#2, AdaptasionSet/baseURL 112B of the main video MS#2, and AdaptasionSet/baseURL 112C of the audio are described.

Moreover, in FIG. 11, the thumbnail video TS#1 supplied by the service ch#1, the thumbnail video TS#2 supplied by the service ch#2, and the thumbnail video supplied by the service ch#3 are the videos having the same image size of, for example, 480×270 (width×height) pixels and arranged in, for example, 4×4 matrix on a display screen of, for example, 1920×1080 pixels.

Furthermore, the stream $131_1$ of the thumbnail video TS#1 supplied by the service ch#1, a stream 1312 of the thumbnail video TS#2 supplied by the service ch#2, and a stream 1313 of the thumbnail video supplied by the service ch#3 are collectively distributed by multicast, for example, in one FLUTE session on the MBMS bearer.

In the SDP 121, as described above, the IP address and the port number to distribute by multicast in one FLUTE session the stream $131_1$ of the thumbnail video TS#1 supplied by the service ch#1, the stream 1312 of the thumbnail video TS#2 supplied by the service ch#2, and the stream 1313 of the thumbnail video supplied by the service ch#3 are described.

The client 13 can recognize, by receiving the USD of FIG. 11, that the thumbnail video is to be distributed with the /@r7:serviceClass attribute 73 to which the attribute value "urn:MosaicableComponents" as the thumbnail signaling information is set or the /@thumbnailVideo attribute.

Moreover, the client 13 can recognize that there is a stream to be distributed by multicast and the stream to be distributed by multicast is (the stream of) the thumbnail video with the /broadcast element 83 and the like including the /@thumbnailVideo attribute.

Then, the client 13 receives, with the URI of the SDP 121 indicated by the /broadcast element 83, the /association element 84, the /sessionDescription element 85 or the like, the SDP 121 in which the IP address and the port number, to which the thumbnail video is to be distributed by multicast, are described, and can receive, based on the IP address and the port number described in the SDP 121, the stream $131_1$ of the thumbnail video TS#1 supplied by the service ch#1, the stream 1312 of the thumbnail video TS#2 supplied by the service ch#2, and the stream 1313 of the thumbnail video supplied by the service ch#3 which are to be distributed by multicast in one FLUTE session.

Thus, the client 13 receives the thumbnail video TS#1 of the service ch#1, the thumbnail video TS#2 of the service ch#2, and the thumbnail video of the service ch#3 as the content supplied by each of the plurality of services constituting a mosaic screen MZ, and can easily generate the mosaic screen MZ using the thumbnail videos.

Note that, in the USD of FIG. 11, although three /r12: appServiceDescription elements (the /r12:appServiceDescription element 81 or 91) indicating that the content is to be distributed by multicast (or to be distributed by broadcast) or to be distributed by unicast are described, the number of /r12:appServiceDescription elements described in one USD is not limited to three.

In other words, in one USD, for example, the number of /r12:appServiceDescription elements of services which supply the thumbnail videos capable of constituting a mosaic screen MZ can be described.

As the thumbnail video capable of constituting a mosaic screen MZ, thumbnail videos having a same genre, such as baseball relay broadcasting, can be adopted. However, the thumbnail video capable of constituting a mosaic screen MZ are not limited to thumbnail videos having a same genre.

Furthermore, at the client 13, when a user who watches the mosaic screen MZ in which the thumbnail video TS#1 of the service ch#1, the thumbnail video TS#2 of the service ch#2, and the thumbnail video of the service ch#3 are arranged selects a thumbnail video on the mosaic screen MZ, the user can perform channel selection to switch the display screen from the mosaic screen MZ to a main video (and audio) supplied by the service which supplies the thumbnail video selected by the user.

When, for example, the user selects the thumbnail video TS#1 of the service ch#1, the client 13 can acquire (receive or recognize) the MPD 111 of the content of the service ch#1 based on the /@mpdURI attribute 82 included in the /r12: appServiceDescription element 81 about the service ch#1 (the /r12:appServiceDescription element 81 including the /broadcast element 83 indicating that the thumbnail video TS#1 of the service ch#1 is to be distributed by multicast).

Furthermore, the client 13 can recognize, based on the /unicast elements 86 and 87 included in the /r12:appServiceDescription element 81 about the service ch#1, that the main video MS#1 and the audio of the service ch#1 are to be distributed by unicast.

Then, the client 13 transmits, based on the MPD 111, the HTTP request which requests the main video MS#1 and the audio of the service ch#1, and can receive and reproduce the main video MS#1 and the audio of the service ch#1 to be distributed by unicast in response to the HTTP request.

Note that, the main video MS#1 and the audio of the service ch#1 are not only to be distributed by unicast, but also to be distributed by multicast similarly to the thumbnail video TS#1 of the service ch#1.

The main video MS#1 and the audio of the service ch#1 (furthermore, a main video and audio of a service which supplies a thumbnail video capable of constituting a mosaic screen MZ) as well as the thumbnail video TS#1 of the service ch#1 (furthermore, a thumbnail video of another channel capable of constituting a mosaic screen MZ) can be distributed by multicast in the same FLUTE session.

In this case, it is possible to significantly improve the performance of the channel selection at the client 13, that is, to extremely quickly switch the mosaic screen MZ to the main video and the audio of the service which supplies the thumbnail video selected by the user.

<An MPD as Thumbnail Metadata>

Figure 12:
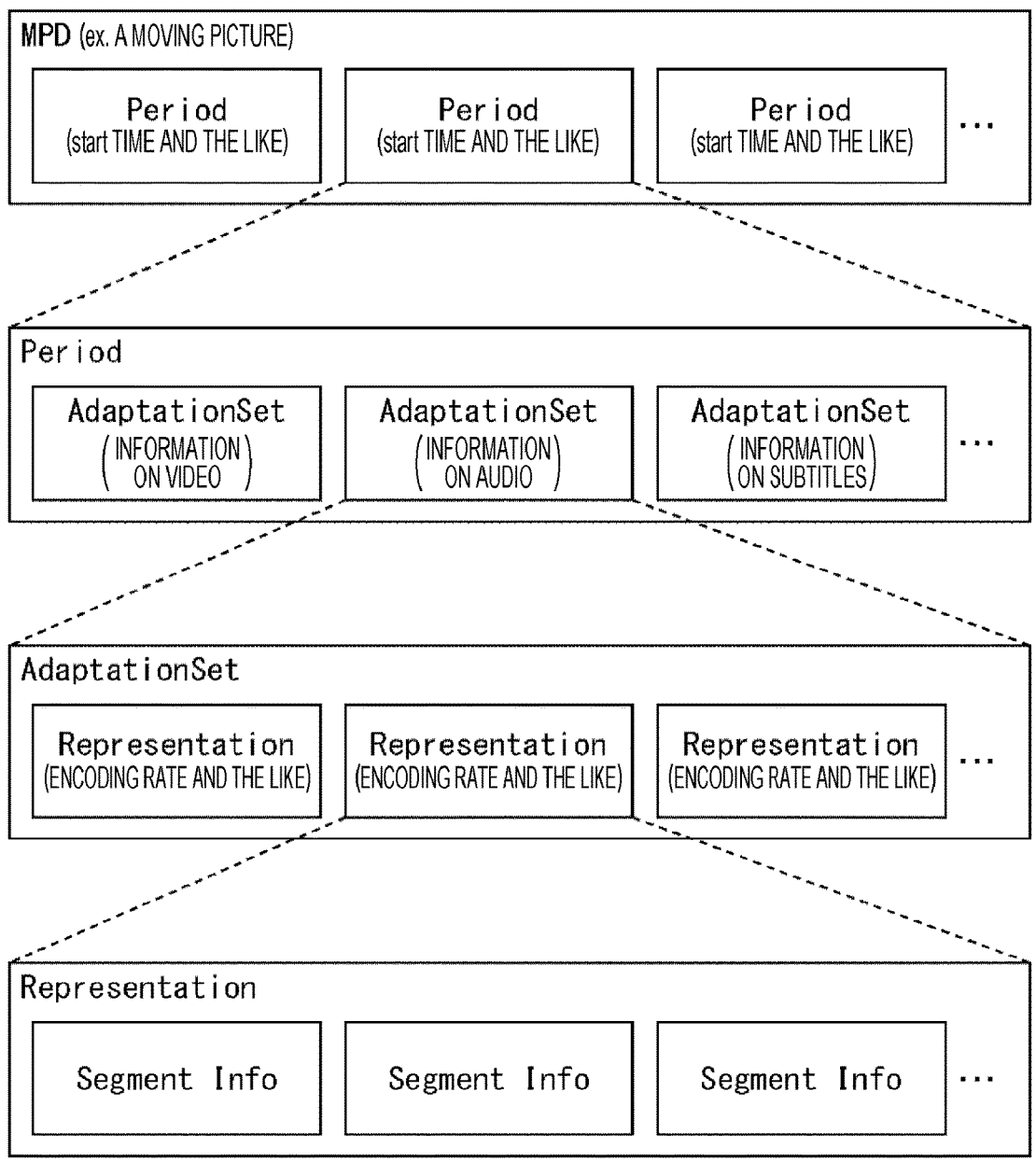
FIG. 12 is a diagram illustrating a summary of an MPD as thumbnail metadata.

FIG. 12 is a diagram illustrating a summary of an MPD as thumbnail metadata.

An MPD as thumbnail metadata is configured similarly to an MPD in the DASH.

In other words, an MPD of a content C has one or more Periods.

The Period indicates a section into which the content C is divided in a time direction, and a start time and the like of the section indicated by the Period are described in the Period.

The Period has the necessary number of AdaptationSets. The AdaptationSet is prepared for each media, such as a video, audio, or subtitles, and information, such as a language or codec, is described in the AdaptationSet.

The AdaptationSet has a necessary number of Representations. The Representation is prepared for, for example, each bit rate, and a bit rate, an image size, and the like are described in the Representation.

The Representation has the necessary number of pieces of SegmentInfo, and information on a segment is described in the SegmentInfo.

FIG. 13 is a diagram illustrating examples of elements and attributes of XML which constitute an MPD described in XML as thumbnail metadata.

An MPD includes MPD (element), MPD/@profile (attribute), MPD/Period (element), and MPD/@minBufferTime (attribute).

An MPD element is a root element, and includes a /@profile attribute and a /@minBufferTime attribute.

A /Period element is information on a section, into which the content corresponding to the MPD describing the /Period element (the content whose reproduction control is performed according to the MPD) is divided in a time direction, and used to assemble the segments in the section.

The /@profile attribute indicates an operation profile to which the MPD describing the /@profile attribute conforms, and the /@minBufferTime attribute indicates the minimum buffer time (a buffer amount of data) necessary to start to reproduce the content corresponding to the MPD describing the /@minBufferTime attribute.

The MPD as thumbnail metadata includes the thumbnail signaling information in addition to the above MPD element, /@profile attribute, /Period element, and /@minBufferTime attribute.

As the thumbnail signaling information included in the MPD, an MPD/Period/AdaptationSet/ViewPoint/@schemeIdURI attribute in which, for example, the information indicating the content whose reproduction control is performed according to the MPD is the thumbnail video is described as an attribute value can be adopted.

Note that, as the thumbnail metadata, instead of the above MPD element, /@profile attribute, /Period element, /@minBufferTime attribute, and MPD including thumbnail signaling information, arbitrary metadata including the thumbnail signaling information and information equivalent to one or more of the MPD element, the /@profile attribute, the /Period element, and the /@minBufferTime attribute can be adopted.

FIG. 14 is a diagram illustrating an example of an MPD described in XML as thumbnail metadata.

In other words, FIG. 14 illustrates an example of an MPD of content including a video thumbnail (for example, the thumbnail video TS#1, the main video MS#1, and the audio as the content supplied by the service ch#1).

In the MPD of FIG. 14, the MPD element is a root element, and a Period element belonging to the MPD element, an AdaptationSet element belonging to the Period element, and a ViewPoint element belonging to the AdaptationSet element are described.

In FIG. 14, the AdaptationSet element in a description 141 is AdaptationSet (element) of the thumbnail video, and includes a width attribute and a height attribute.

In the description 141, width='480' height='270' indicate that the image size of the thumbnail is 480×270 pixels.

The information regarding the display of the thumbnail video, such as an image size, is described as an element included in an attribute belonging to the AdaptationSet element in the description 141 or an element included in the AdaptationSet element.

The ViewPoint element in a description 142 includes a schemeIdURI attribute, and an attribute value "urn:thumbnailVideo" is set to the schemeIdURI attribute in FIG. 14.

The attribute value "urn:thumbnailVideo" is a new scheme identifier indicating that the content whose reproduction control is performed according to the MPD (MPD/Period/AdaptationSet/ViewPoint/@schemeIdURI) including the attribute value "urn:thumbnailVideo" is the thumbnail video.

The schemeIdURI attribute, to which the attribute value "urn:thumbnailVideo" is set, belonging to the ViewPoint element functions as the thumbnail signaling information.

Note that, when the streams having different bit rates as (the stream of) the thumbnail video are prepared, the AdaptationSet element in the description 141 can include the Representation element for each of the plurality of bit rates of the thumbnail video.

According to the above described MPD, the client 13 specifies (a segment of) a thumbnail video, acquires the thumbnail video, and can easily generate a mosaic screen constituted of the thumbnail video.

<An OMA-ESG as Thumbnail Metadata>

FIG. 15 is a diagram illustrating a data model of an OMA-ESG as thumbnail metadata.

The data model of the thumbnail metadata of FIG. 15 is configured similarly to a data model of an OMA-ESG.

However, in the OMA-ESG as thumbnail metadata, the thumbnail signaling information indicating that a video of content supplied by a service whose information is described in the OMA-ESG is a thumbnail video is included in Service 151.

Moreover, in the OMA-ESG as thumbnail metadata, Access 152 includes, for example, a URI of a USD as reference to the USD (FIG. 11) describing the information on the thumbnail video.

FIG. 16 is a diagram illustrating examples elements and attributes of XML which constitute the OMA-ESG described in XML as thumbnail metadata.

The OMA-ESG includes Access (element), Access/@id (attribute), Access/@version (attribute), Access/AccessType (element), Access/AccessType/BroadcastServiceDelivery (element), Access/AccessType/BroadcastServiceDelivery/SessionDescription (element), Access/AccessType/UnicastServiceDelivery (element), Access/ServiceClass (element), and Access/AccessType/BroadcastServiceDelivery/SessionDescription/USBDRef (element).

The Access element is equivalent to the Access 152 of FIG. 15, and is access information which refers to service information on a service to access the service.

A /@id attribute is an access information identifier identifying access information (Access element), and a /@version attribute is version information indicating a version of description contents of access information.

A /AccessType element is information indicating that a service is either of a broadcast type service or a bidirectional type service, and a /BroadcastServiceDelivery element is information indicating that the service is the broadcast type service.

A /SessionDescription element is information indicating that a session description, and a UnicastServiceDelivery element is information indicating that the service is the bidirectional type service.

A /ServiceClass element is information indicating a class of the service, and a /USBDRef element is information to refer to the USD (FIG. 11) describing the information on the thumbnail video and including, for example, the URI of the USD.

An OMA-ESG as thumbnail metadata includes the thumbnail signaling information in addition to the above Access element, Access/@id attribute, Access/@version attribute, Access/AccessType element, Access/AccessType/BroadcastServiceDelivery element, Access/AccessType/BroadcastServiceDelivery/SessionDescription element, Access/AccessType/UnicastServiceDelivery element, Access/ServiceClass element, and /USBDRef element.

As the thumbnail signaling information included in an OMA-ESG, for example, a /ServiceType element in which the information indicating that the content supplied by the service corresponding to the OMA-ESG (the service whose information is described in the OMA-ESG) is the thumbnail video is described can be adopted.

The /ServiceType element is information included in a Service element. The Service element is equivalent to the Service 151 of FIG. 15, and is service information regarding a service. A globalserviceId attribute as a service identifier identifying the Service element (service information) belongs to (is included in) the Service element.

Note that, as the thumbnail metadata, instead of the above Access element, Access/@id attribute, Access/@version attribute, Access/AccessType element, Access/AccessType/BroadcastServiceDelivery element, Access/AccessType/BroadcastServiceDelivery/SessionDescription element, Access/AccessType/UnicastServiceDelivery element, Access/ServiceClass element, /USBDRef element, and OMA-ESG including the thumbnail signaling information, arbitrary metadata including the thumbnail signaling information and information equivalent to one or more of the Access element, the Access/@id attribute, the Access/@version attribute, the Access/AccessType element, the Access/AccessType/BroadcastServiceDelivery element, the Access/AccessType/BroadcastServiceDelivery/SessionDescription element, the Access/AccessType/UnicastServiceDelivery element, the Access/ServiceClass element, and the /USBDRef element.

FIG. 17 is a diagram illustrating an example of an OMA-ESG described in XML as thumbnail metadata.

A of FIG. 17 illustrates an example of a Service element of an OMA-ESG as thumbnail metadata, and B of FIG. 17 illustrates an example of an Access element of an OMA-ESG as thumbnail metadata.

In the Service element of A of FIG. 17, for example, "12" as the value indicating that a video supplied by a service corresponding to the OMA-ESG describing the Service element is the thumbnail video is introduced as a new value of the /ServiceType element.

Then, the new value "12" is set to the /ServiceType element.

The Service element of A of FIG. 17 includes a Service/globalserviceId attribute as a service identifier, and the identification (ID) as the service identifier of the Service element of A of FIG. 17 is set to the globalserviceId attribute.

Here, when the new value "12" is set to the /ServiceType element, the content whose information is described in the Service element including the /ServiceType element includes at least a thumbnail video suitable for constituting a mosaic screen.

In the Access element of B of FIG. 17, as reference to (the bundleDescription element (FIG. 11) which is a root element of) the USD describing the information on the thumbnail video supplied by the service corresponding to the OMA-ESG in which the /USBDRef element is described, for example, the information including the URI of the USD is described in the /USBDRef element.

Furthermore, the Access element of B of FIG. 17 includes an Access/ServiceReference element, and the /ServiceReference element includes an Access/ServiceReference/@idRef attribute.

Then, to the /@idRef attribute, the value set to the globalserviceId attribute of the Service element of A of FIG. 17 is set as the ID of the Service element to be referred by the Access element in which the /@idRef attribute is described.

Figure 18:
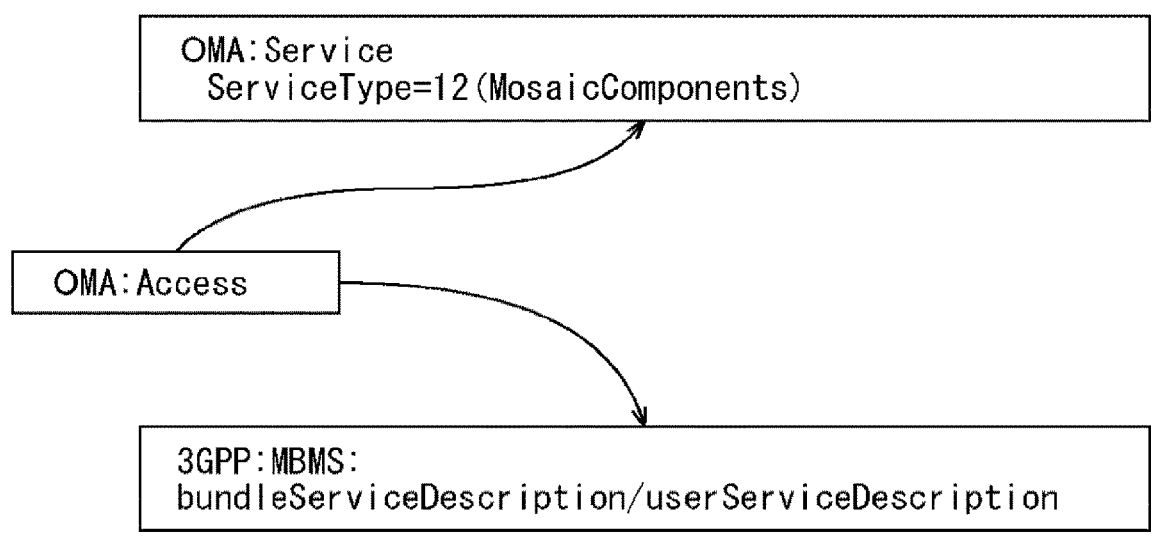
FIG. 18 is a diagram for explaining an OMA-ESG as thumbnail metadata.

FIG. 18 is a diagram for explaining the OMA-ESG as thumbnail metadata of FIG. 17.

When receiving the OMA-ESG as thumbnail metadata of FIG. 17, the client 13 can refer to, based on the /@idRef attribute of the Access element of B of FIG. 17, the Service element of A of FIG. 17.

By referring to the /ServiceType element in which the new value "12" of the Service element of A of FIG. 17 is described, the client 13 can recognize that the video supplied by the service corresponding to the OMA-ESG describing the Service element is the thumbnail video.

Then, when the thumbnail video supplied by the service corresponding to the OMA-ESG describing the Service element of A of FIG. 17 is needed, the client 13 recognizes the URI as the reference to (the bundleDescription element (FIG. 11) which is the root element of) the USD describing the information on the thumbnail video supplied by the service corresponding to the OMA-ESG describing the /USBDRef element by referring to the /USBDRef element of the Access element of B of FIG. 17, and can acquire (receive) the USD (FIG. 11) describing the information on the thumbnail video based on the URI.

Thereafter, the client 13 receives, similarly to the case where the USD of FIG. 11 is received, the thumbnail video, and can easily generate a mosaic screen using the thumbnail video.

Note that, when a combination of an MPD, an SDP, a USD, and an OMA-ESG is used as thumbnail metadata, it can be recognized, from the Service/ServiceType element of the OMA-ESG, whether a video is the thumbnail video, and the /@r7:serviceClass attribute 73 of the USD (FIG. 11) can be omitted accordingly.

<A Method for Distributing Content>

Figure 19:
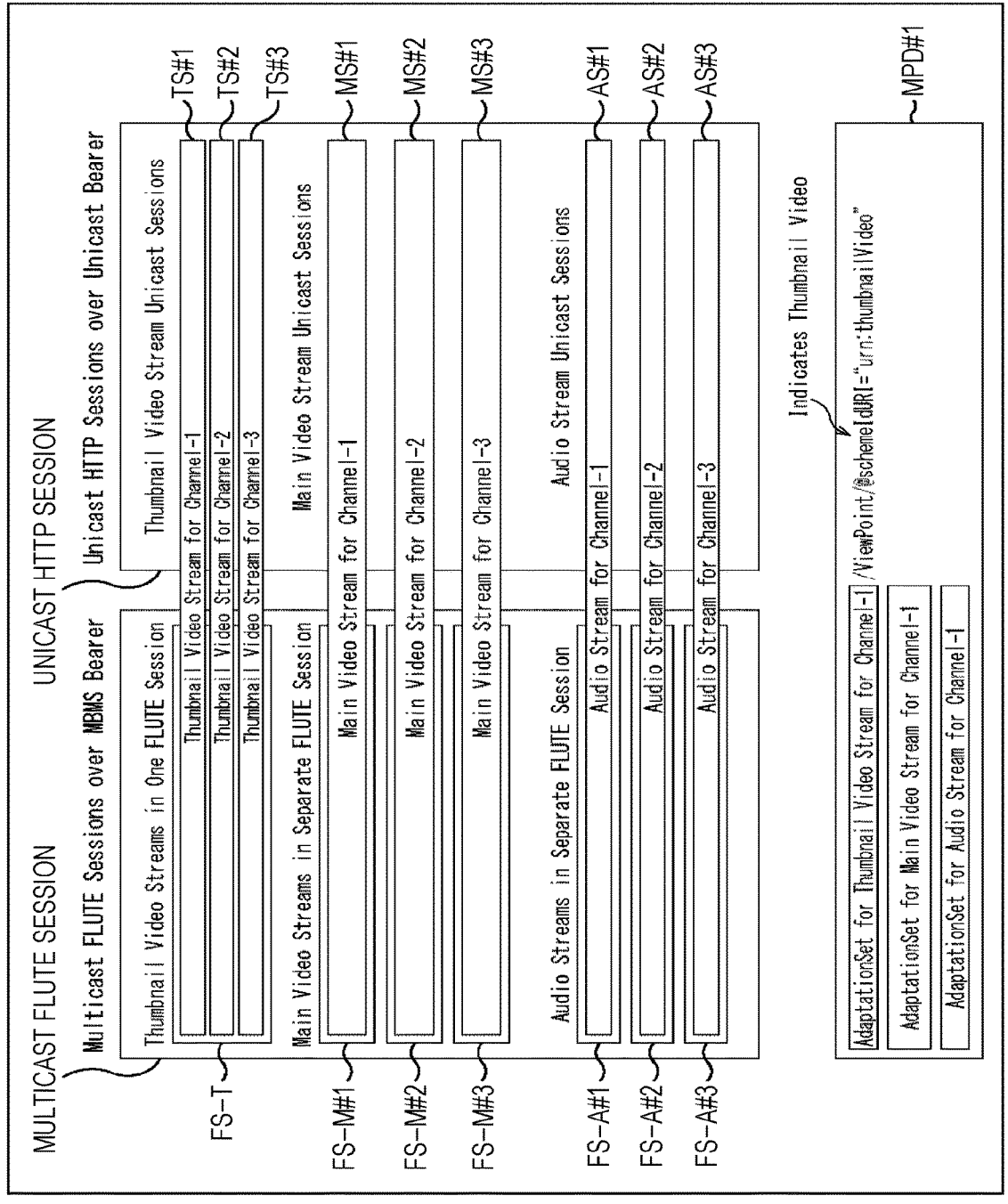
FIG. 19 is a diagram illustrating a first example of a method for distributing content including a thumbnail video.

FIG. 19 is a diagram illustrating a first example of a method for distributing content including a thumbnail video.

Note that, it is assumed that three streams of the main video, the audio, and the thumbnail video are distributed at, for example, each of three broadcasting stations (services) of the channels ch#1, ch#2, and ch#3 in FIG. 19.

Furthermore, the main video, the audio, and the thumbnail video to be distributed at the channel ch#i (here, i=1, 2, 3) are referred to as a main video MS#i, audio AS#i, and a thumbnail video TM#i respectively.

These are similarly applied to FIGS. 20 and 21, and FIGS. 27 to 29 which will be described later.

In FIG. 19, the main videos MS#1 to MS#3, the audio AS#1 to AS#3, and the thumbnail videos TM#1 to TM#3 may be distributed by either of multicast (for example, by multicast in a multicast FLUTE session) or unicast (for example, by unicast in a unicast HTTP session).

Then, when the main videos MS#1 to MS#3, the audio AS#1 to AS#3, and the thumbnail videos TM#1 to TM#3 are to be distributed by multicast, the thumbnail videos TM#1 to TM#3 are to be distributed by multicast in one FLUTE session FS-T.

Furthermore, the main video MS#1 is to be distributed by multicast in one FLUTE session FS-M#1, the main video MS#2 is to be distributed by multicast in one FLUTE session FS-M#2, and the main video MS#3 is to be distributed by multicast in one FLUTE session FS-M#3.

Moreover, the audio AS#1 is to be distributed by multicast in one FLUTE session FS-A#1, the audio AS#2 is to be distributed by multicast in one FLUTE session FS-A#2, and the audio AS#3 is to be distributed by multicast in one FLUTE session FS-A#3.

Note that, an MPD#1 of content of the channel ch#1 includes the AdaptationSet (element) of each of the main video MS#1, the audio AS#1, and the thumbnail video TM#1. Moreover, the AdaptationSet of the thumbnail video TM#1 of the MPD#1 includes a ViewPoint/@schemeIdURI attribute to which an attribute value "urn:thumbnailVideo" as the thumbnail signaling information signaling that (the video of) the AdaptationSet is the thumbnail video is set. Note that, as an element to which a /@schemeIdURI attribute to set an attribute value "urn:thumbnailVideo" and the like belongs, an element having the same configuration similar to the ViewPoint element, such as a Role element, an EssentialProperty element, and a SupplementalProperty element in addition to the ViewPoint element can be adopted.

This is similarly applied to the MPD of the content of each of the channels ch#2 and ch#3.

Figure 20:
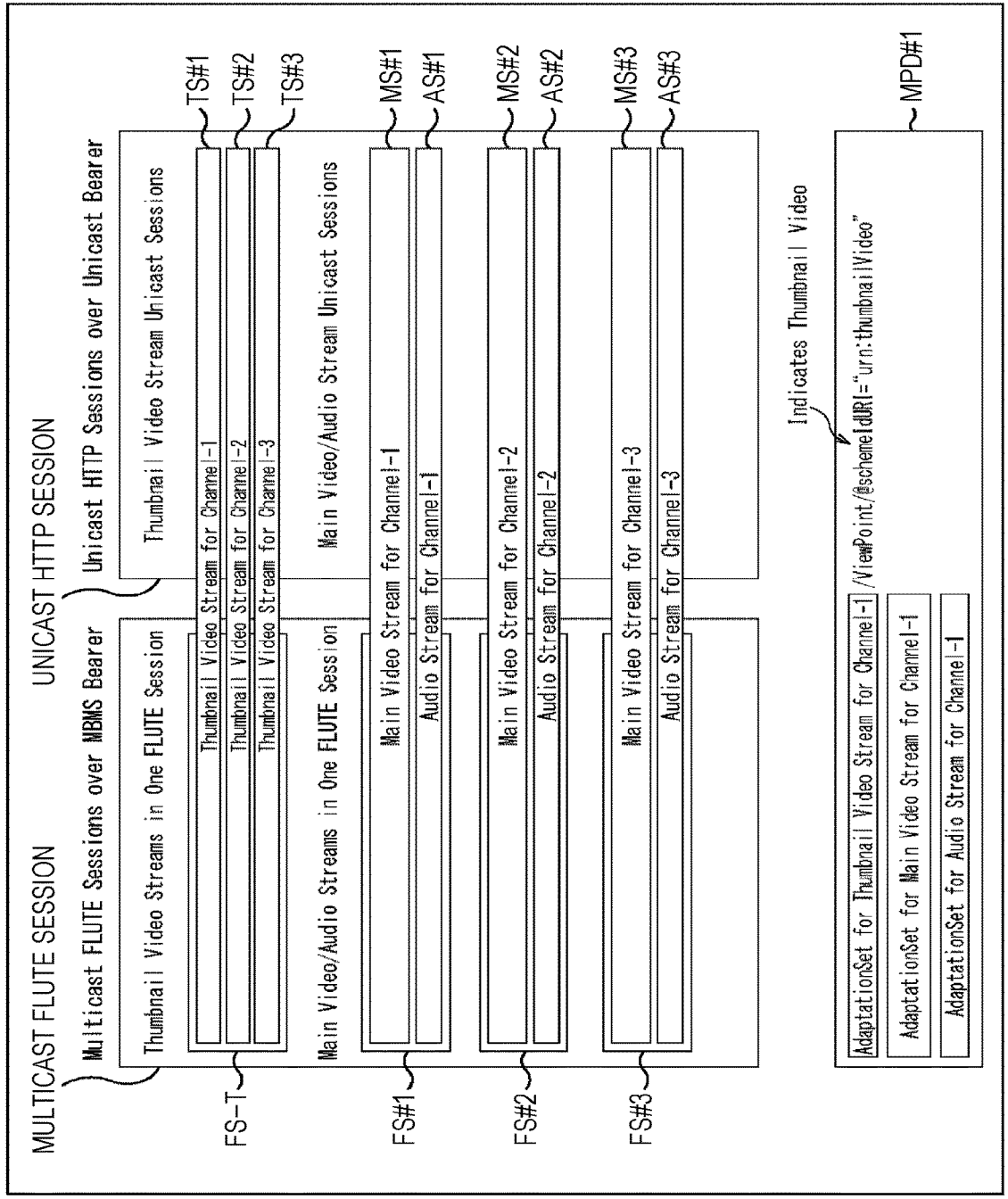
FIG. 20 is a diagram illustrating a second example of a method for distributing content including a thumbnail video.

FIG. 20 is a diagram illustrating a second example of a method for distributing content including a thumbnail video.

In FIG. 20, similarly to FIG. 19, the main videos MS#1 to MS#3, the audio AS#1 to AS#3, and the thumbnail videos TM#1 to TM#3 may be distributed by either of multicast or unicast.

Then, when the main videos MS#1 to MS#3, the audio AS#1 to AS#3, and the thumbnail videos TM#1 to TM#3 are to be distributed by multicast, the thumbnail videos TM#1 to TM#3 are to be distributed by multicast in one FLUTE session FS-T similarly to FIG. 19.

Furthermore, the main video MS#1 and the audio AS#1 are to be distributed by multicast in one FLUTE session FS#1, the main video MS#2 and the audio AS#2 are to be distributed by multicast in one FLUTE session FS#2, and the main video MS#3 and the audio AS#3 are to be distributed by multicast in one FLUTE session FS#3.

Note that, the MPD#1 of the content of the channel ch#1, the MPD of the content of the channel ch#2, and the MPD of the content of the channel ch#3 are configured similarly to the case of FIG. 19.

Figure 21:
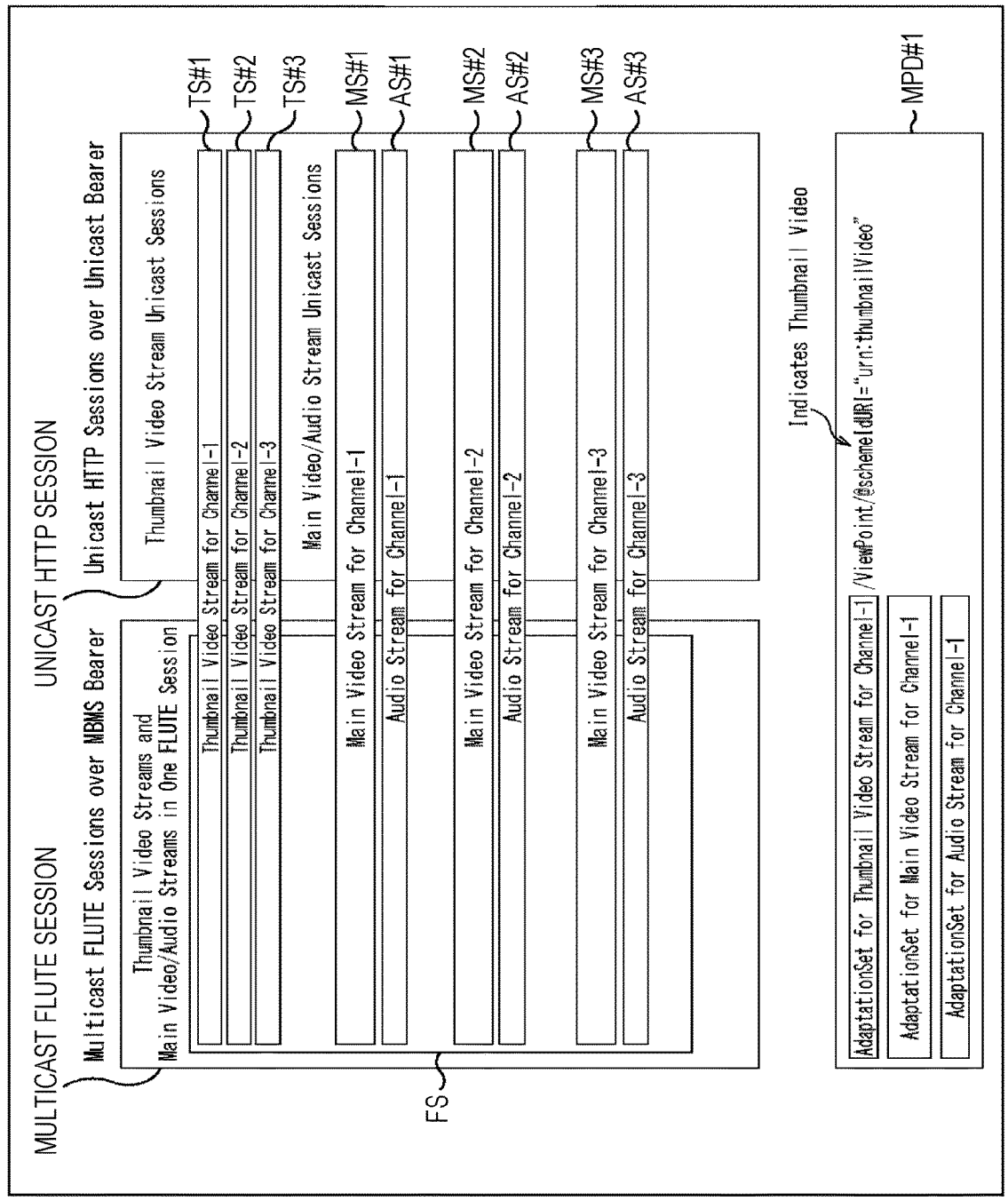
FIG. 21 is a diagram illustrating a third example of a method for distributing content including a thumbnail video.

FIG. 21 is a diagram illustrating a third example of a method for distributing content including a thumbnail video.

In FIG. 21, similarly to FIG. 19, the main videos MS#1 to MS#3, the audio AS#1 to AS#3, and the thumbnail videos TM#1 to TM#3 may be distributed by either of multicast or unicast.

Then, when the main videos MS#1 to MS#3, the audio AS#1 to AS#3, and the thumbnail videos TM#1 to TM#3 are to be distributed by multicast, all of the main videos MS#1 to MS#3, the audio AS#1 to AS#3, and the thumbnail videos TM#1 to TM#3 are to be distributed by multicast in one FLUTE session FS.

Note that, the MPD#1 of the content of the channel ch#1, the MPD of the content of the channel ch#2, and the MPD of the content of the channel ch#3 are configured similarly to the case of FIG. 19.

<Display Example of the Mosaic Screen>

Figure 22:
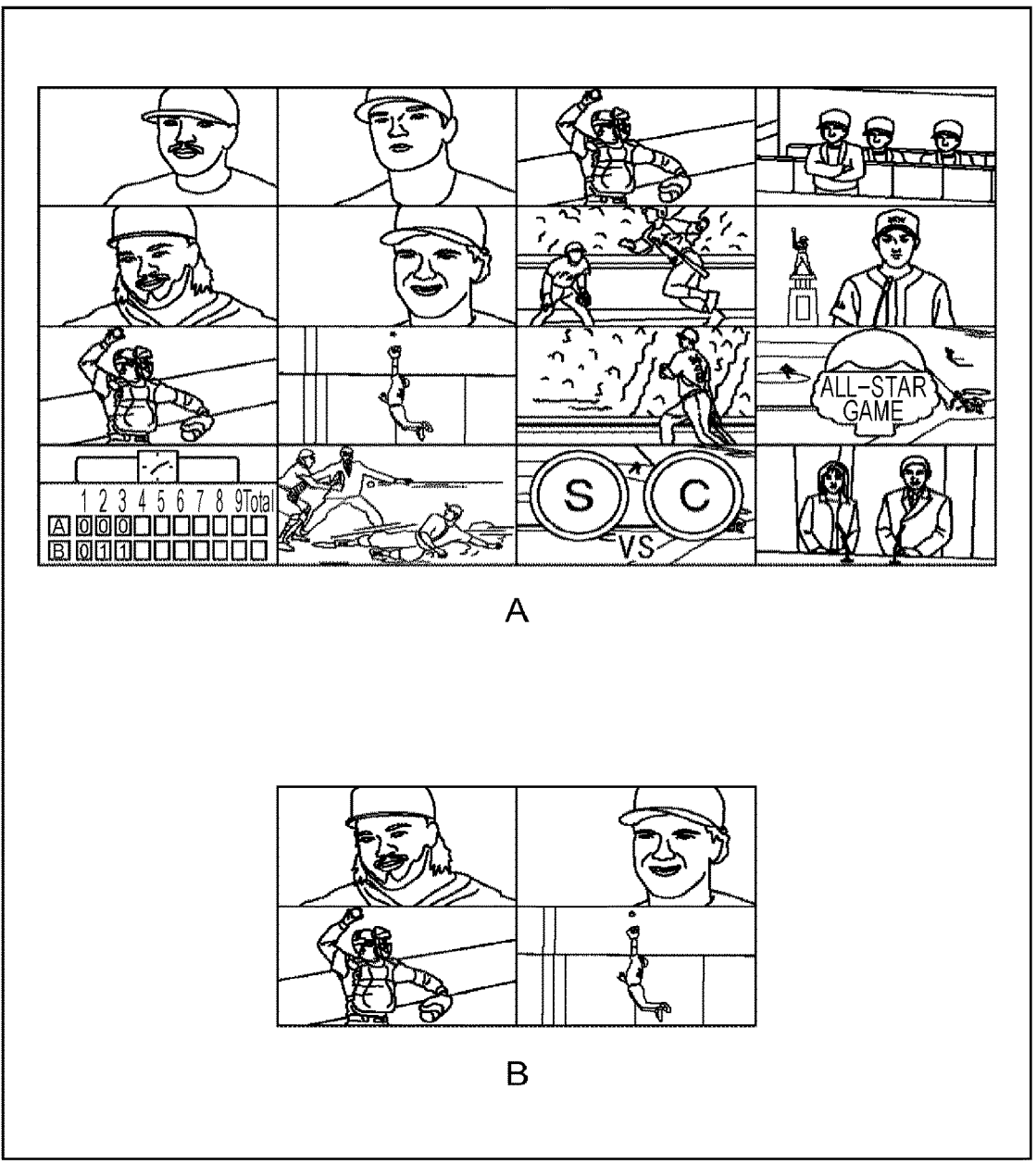
FIG. 22 is a diagram illustrating a display example of a mosaic screen at the client 13.

FIG. 22 is a diagram illustrating a display example of a mosaic screen at the client 13.

As described above, the client 13 can receive thumbnail videos based on a combination of an MPD, an SDP, and a USD as thumbnail metadata or a combination of an OMA-ESG in addition to them, and display a mosaic screen in which the thumbnail videos are arranged in lattice shape.

A of FIG. 22 illustrates an example of a mosaic screen in which sixteen thumbnail videos are arranged in 4×4 matrix, and B of FIG. 22 illustrates an example of a mosaic screen in which four thumbnail videos are arranged in 2×2 matrix.

Now, when the client 13 receives sixteen thumbnail videos and in the case where the image size of each thumbnail video is, for example, 480×270 pixels, and the display screen size of the client 13 is, for example, 1920× 1080 pixels (or more), a mosaic screen in which all of the sixteen thumbnail videos received by the client 13 are arranged in 4×4 matrix can be displayed as illustrated in A of FIG. 22.

However, in the case where the display screen size of the client 13 is smaller than 1920×1080 pixels, for example, is 960×540 pixels, although the client 13 receives sixteen thumbnail videos, the number of thumbnail videos to be displayed as a mosaic screen is limited to four as illustrated in B of FIG. 22.

As described above, when the display screen size of the client 13 is small and the number of thumbnail videos to be displayed as a mosaic screen is limited to the smaller number than the number of thumbnail videos received by the client 13, it is possible to display all of the thumbnail videos received by the client 13 on a mosaic screen by, for example, processing the image size of the thumbnail video into a smaller size according to the display screen size of the client 13.

In other words, by processing a thumbnail video having 480×270 pixels into a thumbnail video having 240×135 pixels, it is possible to display all of sixteen thumbnail videos as a mosaic screen on a display screen having 960×540 pixels.

However, in this case, the client 13 is required to process the image size of the thumbnail video, and the process load of the client 13 increases. Moreover, when a mosaic screen is constituted (generated) by processing the image size of the thumbnail video into the smaller image size, the thumbnail video may be difficult to be watched.

Incidentally, as described above, when the number of thumbnail videos to be displayed as a mosaic screen is not limited as well as when the number of thumbnail videos to be displayed as a mosaic screen is limited, if a thumbnail video constituting a mosaic screen (a thumbnail video to be displayed on a mosaic screen) could be selected (filtered) according to a user's preference, a certain priority, or the like, a mosaic screen suitable (optimal) for a user would be supplied.

Thus, in the present technology, content description metadata which is an attribute describing contents of content (a thumbnail video) is introduced, and the client 13 selects a thumbnail video constituting a mosaic screen using the content description metadata, whereby a mosaic screen suitable for a user is supplied.

<A First Example of an MPD Introducing Content Description Metadata>

FIG. 23 is a diagram illustrating a first example of an MPD introducing content description metadata as thumbnail metadata.

The MPD of FIG. 23 is configured similarly to the MPD of FIG. 14 except that a description 201 is provided instead of the description 142 of FIG. 14.

The ViewPoint element in the description 201 includes a schemeIdURI attribute similarly to the description 142 of FIG. 14, and an attribute value "urn:thumbnailVideo:dic" is set to the schemeIdURI attribute in FIG. 23.

The description "urn:thumbnailVideo" before the colon (:) in the attribute value "urn:thumbnailVideo:dic" is, as described in FIG. 14, a new scheme identifier indicating that the content is the thumbnail video, and according to the scheme identifier "urn:thumbnailVideo", the client 13 can recognize that (the video of) the content is the thumbnail video.

The description "dic" after the colon in the attribute value "urn:thumbnailVideo:dic" is information to specify a dictionary defining a constituent element of a value attribute, which will be described later, (dictionary definition).

The ViewPoint element in the description 201 includes, in addition to the above schemeIdURI attribute, a value attribute which is a new attribute.

The value attribute is content description metadata describing the contents of the content whose reproduction control is performed according to the MPD (MPD/Period/AdaptationSet/ViewPoint) including the value attribute, and the item indicating the contents of the content is set to the value attribute as an attribute value.

In FIG. 23, an attribute value "X, Y, Z, . . . " is described in the value attribute.

One or more items can be described as an attribute value in the value attribute, and when a plurality of items is set to the value attribute as an attribute value, the plurality of items X, Y, Z, . . . is, for example, described by being separated by commas (,) as illustrated in FIG. 23.

The item which is the constituent element constituting the attribute value set to the value attribute is, as described above, defined by the dictionary specified by the description "dic" after the colon in the attribute value "urn:thumbnailVideo:dic".

Thus, the client 13 can recognize, based on the dictionary specified by the description "dic" after the colon in the attribute value "urn:thumbnailVideo:dic", the definition (meaning contents) of each item of the attribute value set to the value attribute.

For example, now it is assumed that it is defined that the first, second, and third items of the attribute value set to the value attribute are genre identification information indicating a genre, country identification information indicating a country, and region identification information indicating a region respectively in the dictionary specified by the description "dic" after the colon in the attribute value "urn:thumbnailVideo:dic".

In this case, for example, when the genre of (the thumbnail video of) the content is "baseball (baseball relay broadcasting)" which relays a baseball game and a host country which hosts the baseball game is "US (America)" and a host region which hosts the baseball game is "CA (California)", the attribute value "baseball, US, CA" is set to (encoded in) the value attribute in (the metadata generator 32 (FIG. 3) of) the aggregation server 12.

The client 13 can recognize, from the attribute value "baseball, US, CA" set to the value attribute based on the dictionary specified by the description "dic" after the colon in the attribute value "urn:thumbnailVideo:dic", that the genre of the content is baseball relay broadcasting and the baseball game is hosted by California in America.

Figure 24:
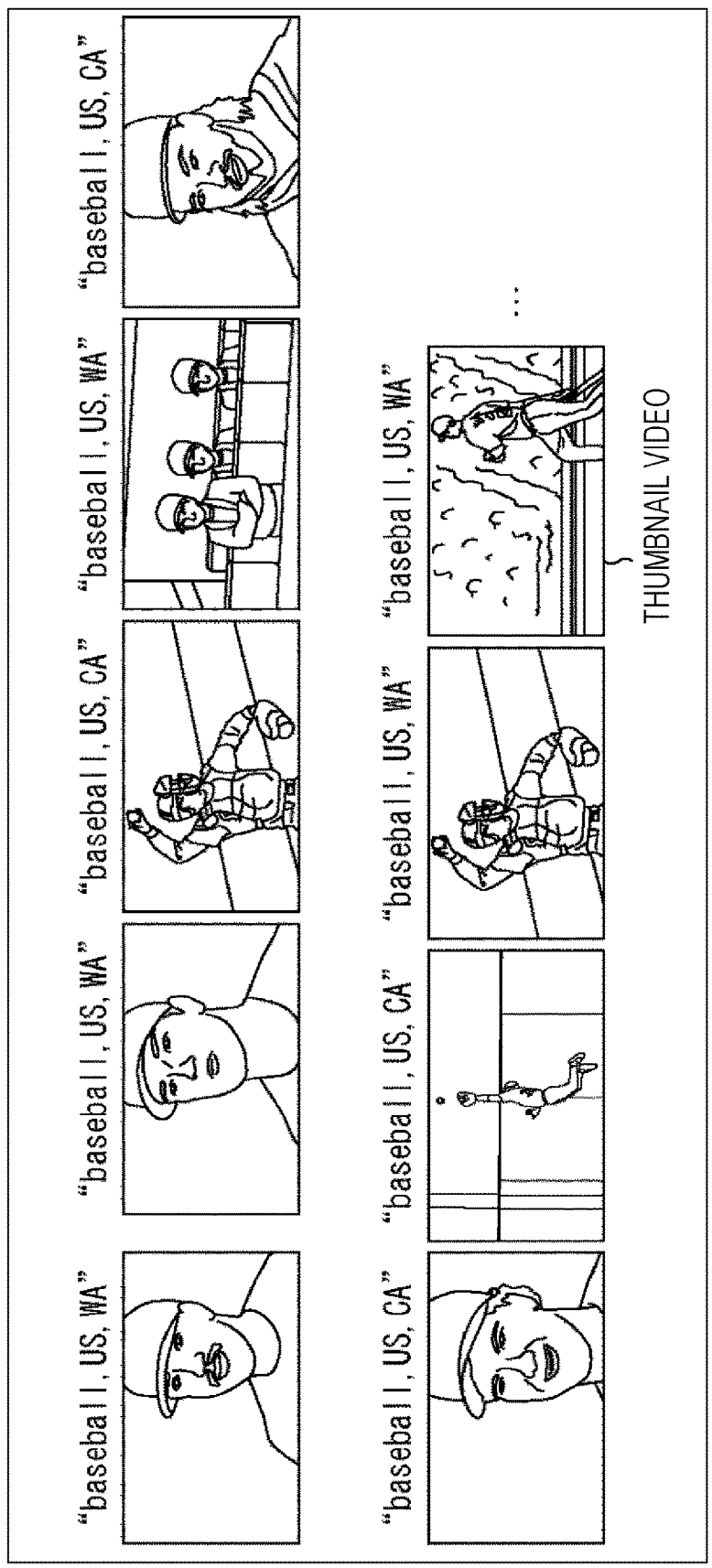
FIG. 24 is a diagram schematically illustrating examples of (streams of) a plurality of thumbnail videos to be distributed by multicast in one FLUTE session.

FIG. 24 is a diagram schematically illustrating an example of (a stream of) a plurality of thumbnail videos to be distributed by multicast in one FLUTE session.

For example, it is assumed that the attribute value "urn:thumbnailVideo:dic" similar to the FIG. 23 is set to the schemeIdURI attribute which is the attribute belongs to the ViewPoint element included in the AdaptationSet element of the thumbnail video in the MPDs (describing the AdaptationSet) of sixteen thumbnail videos when the sixteen thumbnail videos having the same image size of 480×270 pixels are distributed by multicast in one FLUTE session.

Moreover, it is assumed that the attribute value illustrated in FIG. 24 is set to a value attribute for each thumbnail video.

In this case, when the display screen size of the client 13 is, for example, 1920×1080 pixels (or more), the client 13 can display, as illustrated in A of FIG. 22, a mosaic screen in which all of the sixteen thumbnail videos distributed in one FLUTE session and have the image size of 480×270 pixels are arranged in 4×4 matrix.

On the other hand, when the display screen size of the client 13 is smaller than 1920×1080 pixels, for example, is 960×540 pixels, the number of thumbnail videos to be displayed as a mosaic screen at the client 13 is limited to four arranged in 2×2 matrix among the sixteen thumbnail videos as illustrated in B of FIG. 22.

Thus, in this case, four thumbnail videos to be displayed on the mosaic screen need to be selected from the sixteen thumbnail videos.

Thus, the client 13 performs filtering to select four thumbnail videos (to constitute a mosaic screen) to be displayed on a mosaic screen (hereinafter, referred to as thumbnail filtering) using (the attribute value set to) the value attribute of the thumbnail video.

The thumbnail filtering can be performed based on, for example, preference information and the like indicating preference of the user of the client 13.

In other words, for example, when a user frequently views relay broadcasting hosted by California (CA) in America (US), when the place where a user is located (the location of the client 13) is at California in America, or the like, the thumbnail video in which the country identification information among the attribute values set to the value attribute is "US" indicating America and the region identification information is "CA" indicating California is selected from the sixteen thumbnail videos as the thumbnail video to be displayed on a mosaic screen in the thumbnail filtering.

Note that, when the number of thumbnail videos selected in the thumbnail filtering is larger than the number of thumbnail videos which can be displayed on the mosaic screen, the client 13 can select the number of thumbnail videos which can be displayed on a mosaic screen, for example, randomly from, for example, the thumbnail videos selected in the thumbnail filtering. Alternatively, a mosaic screen having a larger size than the display screen size of the client 13 is generated, and the mosaic screen can be scrolled according to a user's operation or the like.

As described above, by adding, to an MPD, a value attribute as an index capable of dynamically being changed in order to perform the thumbnail filtering to the thumbnail video at the client 13, it is possible to achieve an efficient service selection process (channel selection) on a mosaic screen according to a display screen size as restriction in the device rendering environment of the client 13.

<A Second Example of an MPD Introducing Content Description Metadata>

FIG. 25 is a diagram illustrating a second example of an MPD introducing content description metadata as thumbnail metadata.

The MPD of FIG. 25 is configured similarly to the MPD of FIG. 23 except that descriptions 211 and 212 are provided instead of the description 201 of FIG. 23.

The ViewPoint elements in the descriptions 211 and 212 include, similar to the ViewPoint element in the description 201 of FIG. 23, the schemeIdURI attribute, and the value attribute as content description metadata.

An attribute value "urn:thumbnailVideo:dic" is set to the schemeIdURI attribute in the description 211, and an attribute value "urn:thumbnailVideo:JapaneseParameters" is set to the schemeIdURI attribute in the description 212.

As described in FIG. 23, the description "urn:thumbnailVideo" before the colon in the attribute value "urn:thumbnailVideo:dic" or "urn:thumbnailVideo:JapaneseParameters" set to the schemeIdURI attribute belonging to the ViewPoint element is a scheme identifier indicating that the content is the thumbnail video, and the client 13 can recognize that (the video of) the content is the thumbnail video according to the scheme identifier "urn:thumbnailVideo".

Moreover, as described in FIG. 23, the description "dic" or "JapaneseParameters" after the colon in the attribute value "urn:thumbnailVideo:dic" or "urn:thumbnailVideo:JapaneseParameters" is information to specify the dictionary defining the constituent element of the value attribute (dictionary definition).

Now, it is assumed that it is defined that, for example, the first, second and third items of the attribute value set to the value attribute are genre identification information indicating a genre, country identification information indicating a country, and region identification information indicating a region respectively in the dictionary specified by the descriptions "dic" and "JapaneseParameters".

However, it is ruled (defined) that the language of the genre identification information, the country identification information, and the region identification information is, for example, English in the dictionary specified by the description "dic" (hereinafter, referred to as a "dic" dictionary), and it is ruled that the language of the genre identification information, the country identification information, and the region identification information is, for example, Japanese which is the different language from English in the dictionary specified by the description "JapaneseParameters" (hereinafter, referred to as a "JapaneseParameters" dictionary).

Thus, in the description 211 in which the "dic" dictionary is specified, the attribute value as the genre identification information, the country identification information, and the region identification information is described in the value attribute as "baseball, US, CA" in English.

On the other hand, in the description 212 in which the "JapaneseParameters" dictionary is specified, the attribute value as the genre identification information, the country identification information, and the region identification information is described in the value attribute as "baseball, the United States of America, California" in Japanese.

As described above, in (the AdaptationSet element of) the MPD, a plurality of ViewPoint elements are arranged, and (the attribute value set to) the value attribute can be described in different languages.

<A Third Example of an MPD Introducing Content Description Metadata>

FIG. 26 is a diagram illustrating a third example of an MPD introducing content description metadata as thumbnail metadata.

The MPD of FIG. 26 is configured similarly to the MPD of FIG. 23 except that a description 221 is provided instead of the description 201 of FIG. 23.

The ViewPoint element in the description 221 includes, similarly to the ViewPoint element in the description 201 of FIG. 23, the schemeIdURI attribute, and the value attribute as content description metadata.

In the description 211, an attribute value "http://baseballAuthority.com/thumbnailVideoGenre" is set to the schemeIdURI attribute.

The attribute value "http://baseballAuthority.com/thumbnailVideoGenre" serves as a scheme identifier indicating that the content is the thumbnail video and as information to specify a dictionary defining a constituent element of a value attribute (dictionary definition).

Thus, the client 13 can recognize that (the video of) the content is the thumbnail video with the attribute value "http://baseballAuthority.com/thumbnailVideoGenre".

Moreover, the attribute value "http://baseballAuthority.com/thumbnailVideoGenre" is an http URL, and the http URL indicates the address of the dictionary defining the constituent element (item) of the value attribute.

As the described above, when the dictionary defining the constituent element of the value attribute is specified by the http URL, it is possible to arrange the dictionary defining the constituent element of the value attribute in a (web) server on an network, such as the internet, or to distribute the dictionary in the same FLUTE session as the session in which the thumbnail video is distributed (if the client 13 cannot use a bidirectional bearer).

In this case, it is possible to easily change the dictionary defining the constituent element of the value attribute, and to flexibly easily change (add and erase) the definition of the constituent element of the value attribute by the dictionary accordingly.

<A Method for Distributing Content>

Figure 27:
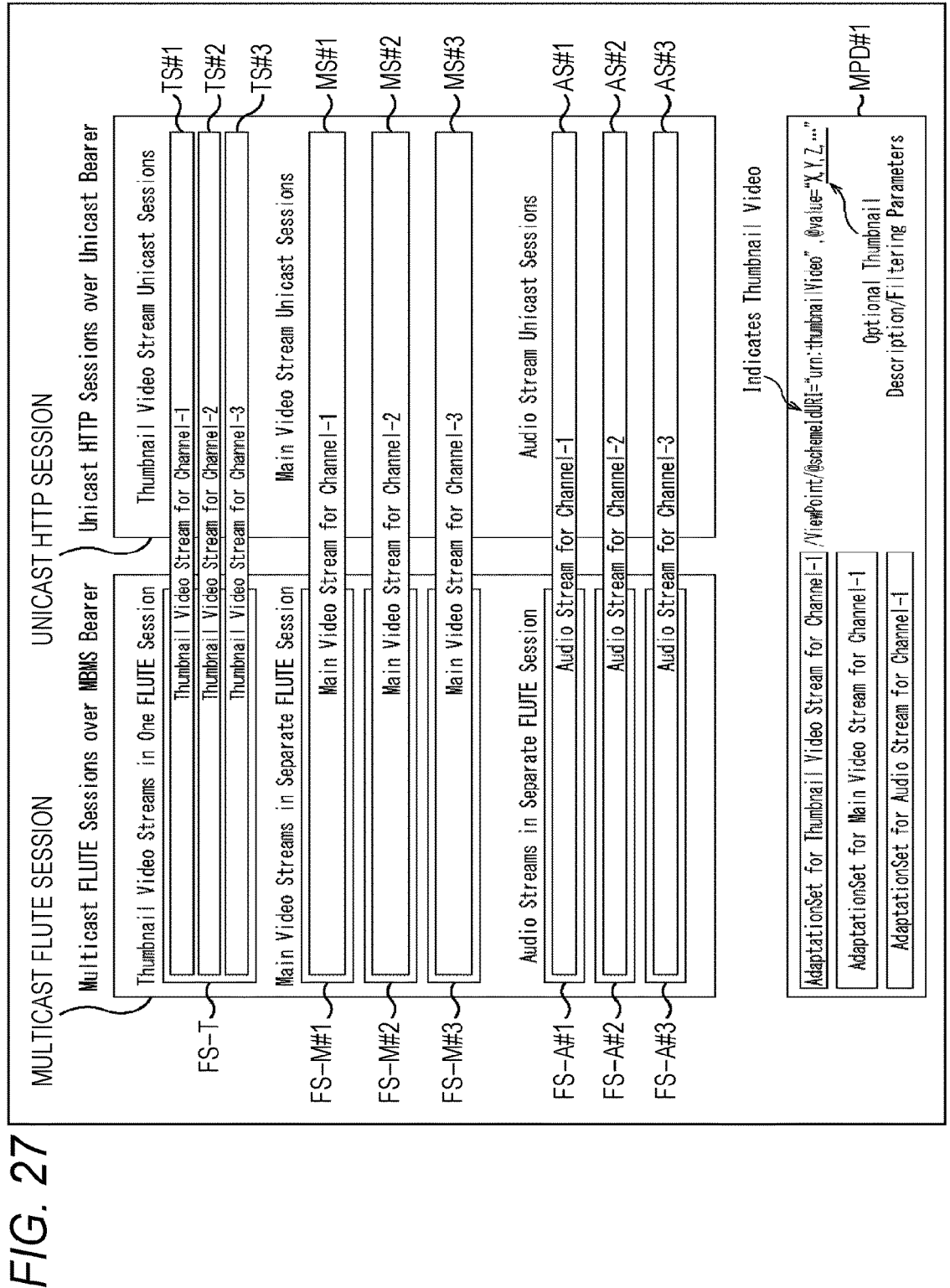
FIG. 27 is a diagram illustrating a fourth example of a method for distributing content including a thumbnail video.
Figure 28:
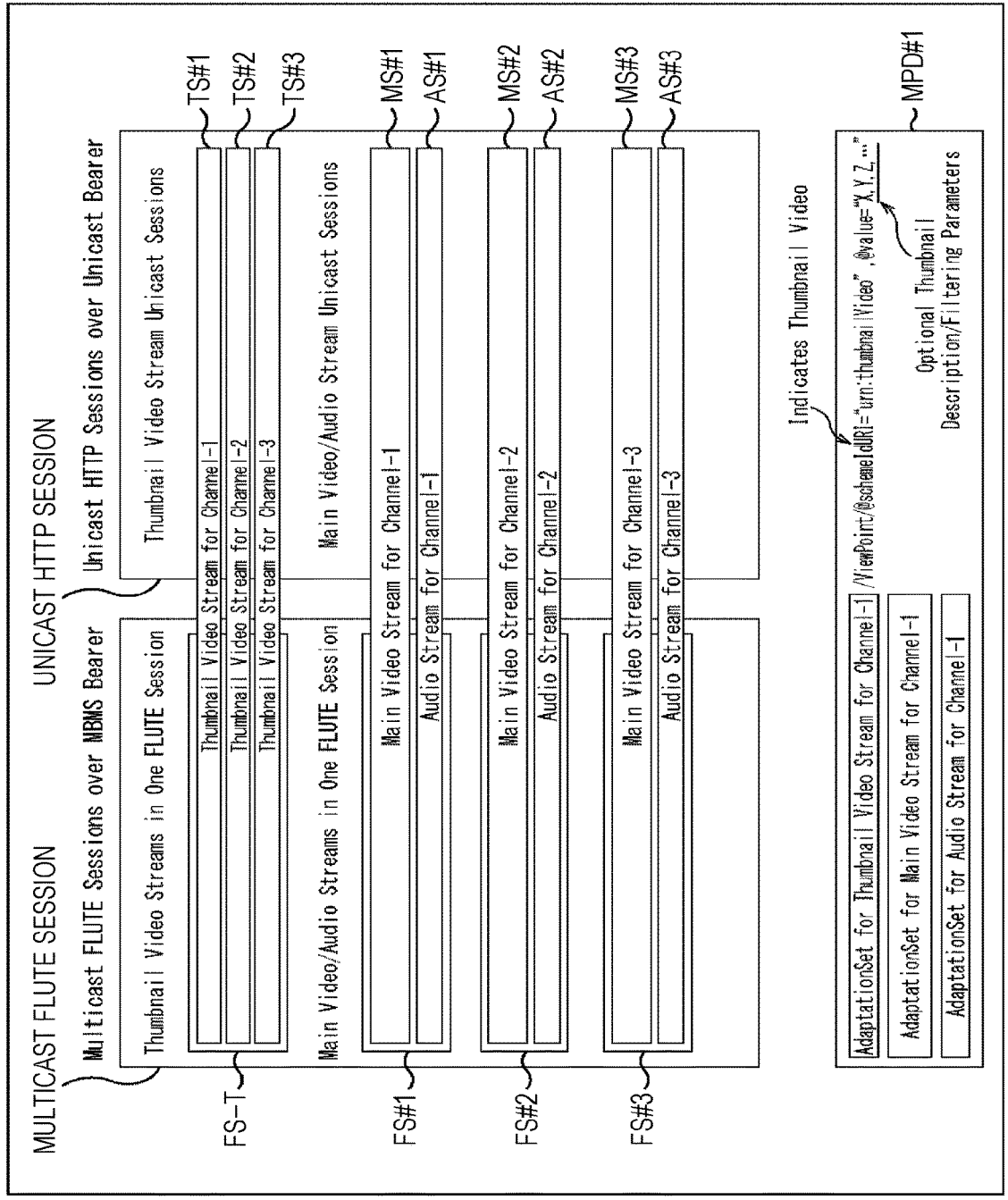
FIG. 28 is a diagram illustrating a fifth example of a method for distributing content including a thumbnail video.
Figure 29:
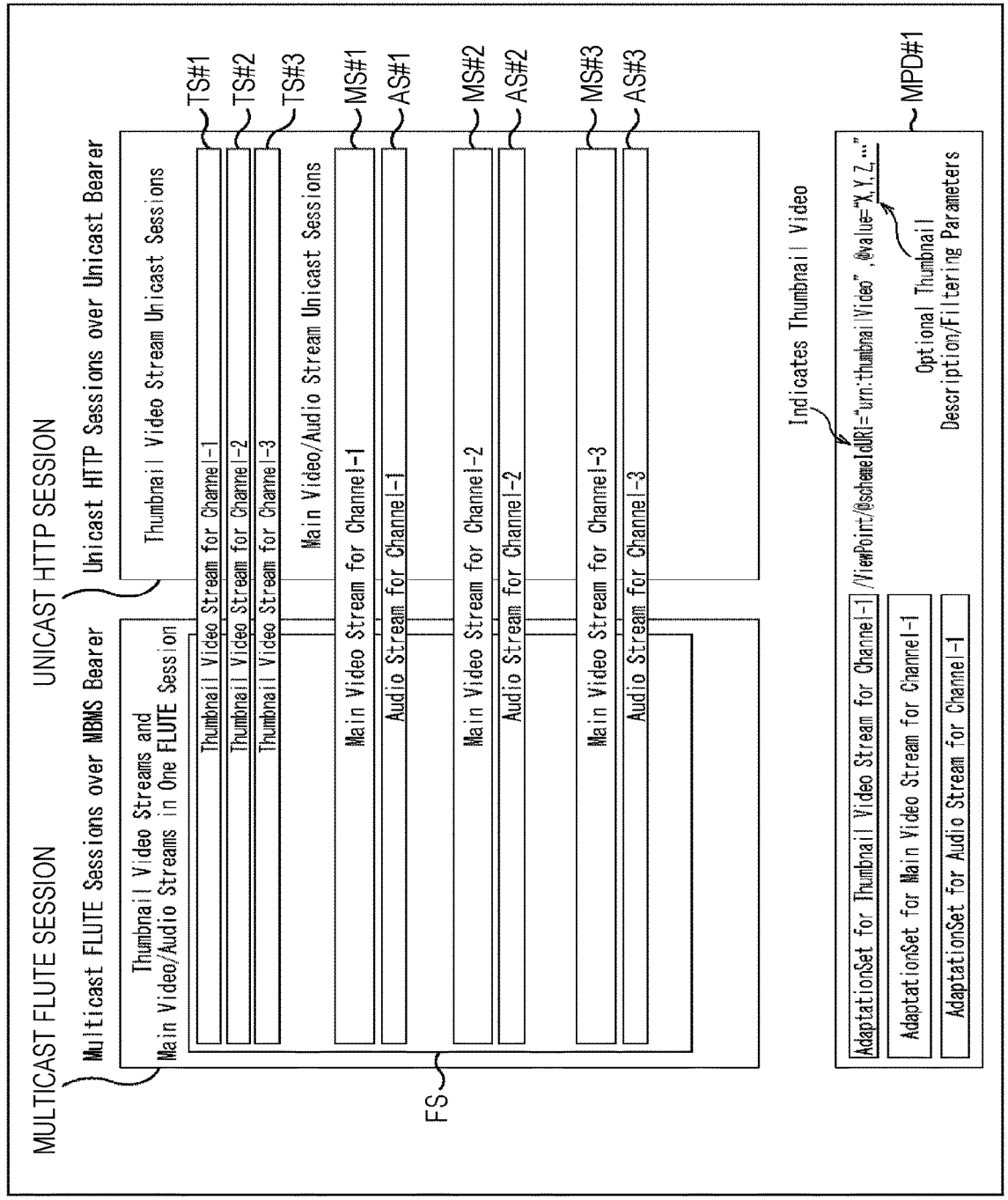
FIG. 29 is a diagram illustrating a sixth example of a method for distributing content including a thumbnail video.

FIGS. 27, 28, and 29 are diagrams illustrating examples of methods for distributing content including a thumbnail video when a value attribute as content description metadata is introduced to an MPD.

In other words, FIG. 27 is a diagram illustrating a fourth example of a method for distributing content including a thumbnail video, FIG. 28 is a diagram illustrating a fifth example of a method for distributing content including a thumbnail video, and FIG. 29 is a diagram illustrating a sixth example of a method for distributing content including a thumbnail video.

In FIGS. 27 to 29, similarly to the cases of FIGS. 19 to 21 respectively, the main videos MS#1 to MS#3, the audio AS#1 to AS#3, and the thumbnail videos TM#1 to TM#3 of three broadcasting stations (services) of the channels ch#1 to ch#3 are to be distributed.

Furthermore, in FIGS. 27 to 29, similarly to the cases of FIGS. 19 to 21 respectively, the MPD#1 of the content of the channel ch#1 includes the AdaptationSet (element) of each of the main video MS#1, the audio AS#1, and the thumbnail video TM#1, and the AdaptationSet of the thumbnail video TM#1 of the MPD#1 includes a ViewPoint/@schemeIdURI attribute to which, for example, an attribute value "urn:thumbnailVideo" as the thumbnail signaling information to signal that (the video of) the AdaptationSet is the thumbnail video is set.

Moreover, in FIGS. 27 to 29, the AdaptationSet of the thumbnail video TM#1 of the MPD#1 includes the value attribute as content description metadata (and the information to specify the dictionary defining the constituent element of the value attribute), and this point is different form the cases of FIGS. 19 to 21.

As described above, FIGS. 27 to 29 are similar to FIGS. 19 to 21 respectively except that the AdaptationSet of the thumbnail video TM#1 of the MPD#1 (similar to the MPD of the content of each of the channels ch#2 and ch#3) includes the value attribute as content description metadata, and the description is omitted.

<Display of a Mosaic Screen at the Client 13>

Figure 30:
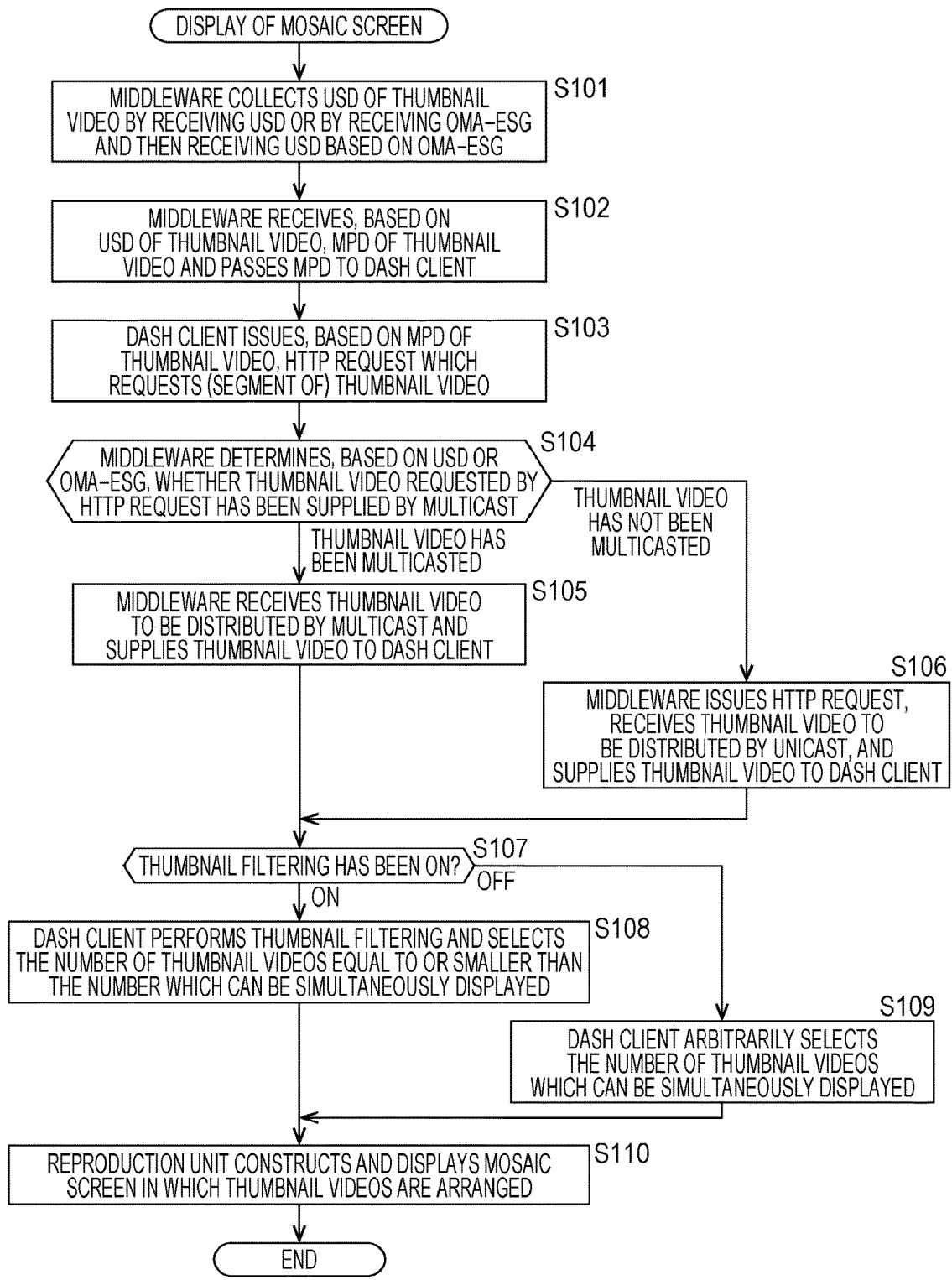
FIG. 30 is a flowchart for explaining a process to display a mosaic screen at the client 13.

FIG. 30 is a flowchart for explaining an example of a process to display a mosaic screen at the client 13.

In step S101, the middleware 41 (FIG. 4) collects a USD of a thumbnail video by receiving the USD or by receiving an OMA-ESG and then receiving the USD based on the OMA-ESG, and the process proceeds to step S102.

In step S102, the middleware 41 receives, based on the USD of the thumbnail video, the MPD of the thumbnail video and supplies (passes) the MPD to the DASH client 42 (FIG. 4), and the process proceeds to step S103.

In step S103, the DASH client 42 issues, based on the MPD of the thumbnail video from the middleware 41, an HTTP request which requests (the segment of) the thumbnail video to the middleware 41, and the process proceeds to step S104.

In step S104, the middleware 41 determines, based on the USD or the OMA-ESG, whether the thumbnail video requested by the HTTP request by the DASH client 42 has been distributed by multicast.

In step S104, when it is determined that the thumbnail video has been distributed by multicast, the process proceeds to step S105. The middleware 41 receives the thumbnail video distributed by multicast and supplies the thumbnail video to the DASH client 42, and the process proceeds to step S107.

On the other hand, when it is determined that the thumbnail video has not been distributed by multicast in step S104, the process proceeds to step S106, and the middleware 41 issues the HTTP request from the DASH client 42 on the network 10. Moreover, the middleware 41 receives, in response to the HTTP request, the thumbnail video distributed by unicast from the channel server 11 (or the aggregation server 12) and supplies the thumbnail video to the DASH client 42, and the process proceeds to step S107.

In step S107, the reception unit 40 (FIG. 4) determines whether the thumbnail filtering has been ON.

Here, whether the ON and OFF of the thumbnail filtering is performed or not, that is, whether the thumbnail filtering is performed or not can be set by, for example, operating the client 13.

In step S107, when it is determined that the thumbnail filtering has been ON, the process proceeds to step S108. The DASH client 42 performs the thumbnail filtering to the thumbnail videos supplied from the middleware 41 using the value attribute as content description metadata described in the MPD of the thumbnail video, selects thumbnail videos constituting a mosaic screen from the thumbnail videos supplied from the middleware 41, and supplies the selected thumbnail videos to the reproduction unit 43 (FIG. 4).

Here, when the number of thumbnail videos selected in the thumbnail filtering is larger than the number of thumbnail videos which can be displayed on the mosaic screen, the client 13 can select (equal to or smaller than) the number of thumbnail videos which can be displayed on the mosaic screen, for example, randomly from, for example, the thumbnail videos selected in the thumbnail filtering.

On the other hand, in step S107, when it is determined that the thumbnail filtering has not been ON, the process proceeds to step S109. The DASH client 42 selects the number of thumbnail videos which can be displayed on a mosaic screen from the thumbnail videos supplied from the middleware 41, for example, randomly, and supplies the selected thumbnail videos to the reproduction unit 43.

After steps S108 and S109, the process proceeds to step S110. The reproduction unit 43 constructs and displays the mosaic screen in which the thumbnail videos from the DASH client 42 are arranged, and the process to display the mosaic screen is terminated.

<Explanation of a Computer Employing the Present Technology>

Next, the above series of processes can be performed by hardware or by software. When the series of processes is performed by software, a program constituting the software is installed in a general-purpose computer or the like.

Figure 31:
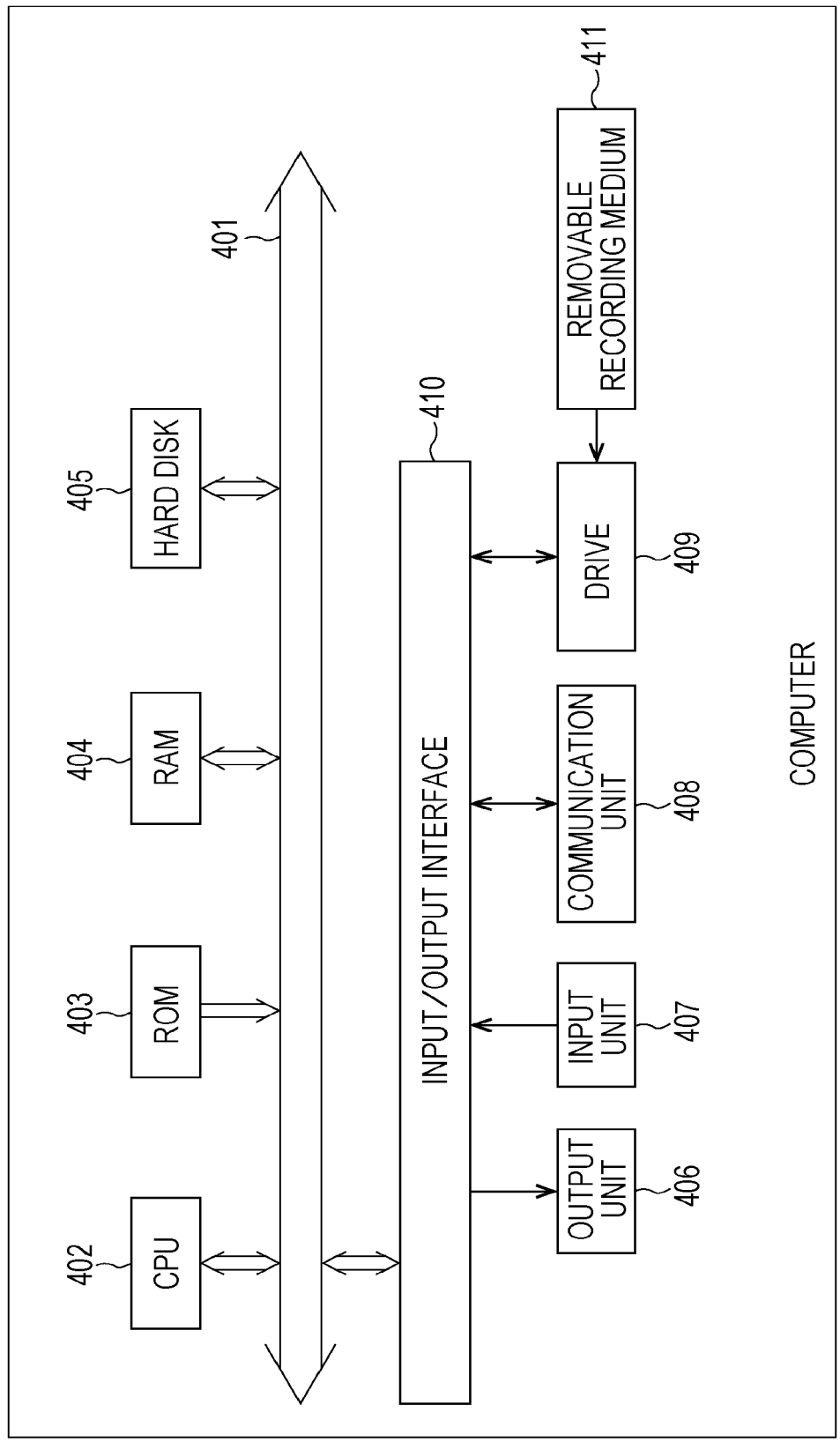
FIG. 31 is a block diagram illustrating a configuration example of an embodiment of a computer employing the present technology.

Thus, FIG. 31 illustrates a configuration example of an embodiment of a computer in which the program to execute the above series of processes is installed.

The program can be recorded in advance in a hard disk 405 or a ROM 403 as a recording medium incorporated in the computer.

Alternatively, the program can be stored (recorded) in a removable recording medium 411. Such removable recording medium 411 can be supplied as so-called package software. Here, the removable recording medium 411 is, for example, a flexible disk, a compact disc read only memory (CD-ROM), a magneto optical (MO) disc, a digital versatile disc (DVD), a magnetic disk, a semiconductor memory, or the like.

Note that, the program can be installed in the computer from the above described removable recording medium 411, and also installed in the incorporating hard disk 405 after being downloaded in the computer via a communication network or a broadcasting network. In other words, the program can be wirelessly transferred to the computer from, for example, a download site via an artificial satellite for digital satellite broadcast, or wiredly transferred to the computer via a network, such as a local area network (LAN) or the internet.

The computer incorporates a central processing unit (CPU) 402, and an input/output interface 410 is connected to the CPU 402 via a bus 401.

When a user operates an input unit 407 via the input/output interface 410 and a command is supplied, the CPU 402 executes, according to the command, the program stored in the read only memory (ROM) 403. Alternatively, the CPU 402 loads the program stored in the hard disk 405 to a random access memory (RAM) 404 and executes the program.

Thus, the CPU 402 performs the process according to the above described flowchart or the process performed by the configurations of the above described block diagrams. Then, the CPU 402, for example, outputs the process result from an output unit 406, transmits the process result from a communication unit 408, or records the process result in the hard disk 405 via the input/output interface 410 as needed.

Note that, the input unit 407 is constituted of a keyboard, a mouse, a microphone, and the like. Furthermore, the output unit 406 is constituted of a liquid crystal display (LCD), a speaker, and the like.

Here, the process performed by the computer according to the program in the present specification is not necessarily performed in time series according to the order described as the flowchart. In other words, the process performed by the computer according to the program includes a process to be executed in parallel or independently (including, for example, a parallel process or a process by objects).

Furthermore, the program may be performed by one computer (processor) or may be dispersedly performed by a plurality of computers. Moreover, the program may be transferred to a distant computer and executed.

Moreover, in the present specification, a system means a collection of a plurality of constituent elements (apparatuses, modules (parts), and the like), and all constituent elements are not necessarily in a same casing. Thus, both of a plurality of apparatuses stored in separated casings and connected with each other via a network, and an apparatus having a plurality of modules in a casing are a system.

Note that, embodiments of the present technology are not limited to the above described embodiments, and can be variously modified without departing from the scope of the present technology.

For example, the present technology can be a configuration of cloud computing in which a function is shared/cooperatively processed shared by a plurality of apparatuses via a network.

Furthermore, each step described in the above described flowchart can be performed by one apparatus, and shared and performed by a plurality of apparatuses.

Moreover, when a step includes a plurality of processes, the plurality of process included in the step can be performed by an apparatus, and shared and performed by a plurality of apparatuses.

Furthermore, the present technology can be applied to content distribution other than the DASH.

Furthermore, the effects described in the present specification are merely exemplified and not limited, and there may be other effects.

Note that, the present technology may have the following configurations.

<1>

A transmission apparatus includes a distribution unit configured to distribute metadata of content, the metadata being described using an attribute and an attribute value and including signaling information indicating that a video is a thumbnail video suitable for constituting a mosaic screen, and the attribute indicating information to refer to a file including information to receive content supplied by a service.

<2>

The transmission apparatus according to <1>, in which the information to receive the content supplied by the service includes an IP address and a port number of multicast.

<3>

The transmission apparatus according to <1> or <2>, in which the file is a session description protocol (SDP) file.

<4>

The transmission apparatus according to any one of <1> to <3>, in which the metadata further includes one or more pieces of:
  information on a collection of one or more services;
  information on an individual service;
  a service identifier which is the attribute to identify a service; and
  information on a method for distributing content supplied by a service.

<5>

The transmission apparatus according to <4>, in which the metadata is a user service description (USD) of a multimedia broadcast multicast service (MBMS) and includes:
- a bundleDescription element which is the information on the one or more services;
- a bundleDescription/UserServiceDescription element which is the information on the individual service;
- a bundleDescription/userServiceDescription/@serviceId attribute which is the service identifier;
- a bundleDescription/userServiceDescription/DeliveryMethod element which is the information on the method for distributing the content supplied by the service;
- a bundleDescription/userServiceDescription/DeliveryMethod/@ sessionDescriptionURI attribute which is the attribute indicating the information to refer to the file including the information to receive the content supplied by the service; and
- a bundleDescription/userServiceDescription/@r7:serviceClass attribute which is the signaling information.

<6>

The transmission apparatus according to <5>, in which the USD further includes an r12:appServiceDescription element indicating that the content supplied by the service is to be distributed by either distribution method of multicast or unicast.

<7>

The transmission apparatus according to <6>, in which
- the r12:appServiceDescription element includes either or both of a broadcast element or/and a unicast element,
- the broadcast element and the unicast element each includes a baseURL attribute indicating a uniform resource locator (URL) of the content supplied by the service,
- the broadcast element indicates that the content whose URL is indicated by the baseURL attribute included in the broadcast element is to be distributed by multicast, and
- the unicast element indicates that the content whose URL is indicated by the baseURL attribute included in the unicast element is to be distributed by unicast.

<8>

The transmission apparatus according to <7>, in which the broadcast element includes, as the signaling information, a thumbnailVideo attribute indicating whether the content whose URL is indicated by the baseURL attribute included in the broadcast element is the thumbnail video.

<9>

The transmission apparatus according to <8>, in which the USD includes the /r12:appServiceDescription element of each of a plurality of contents capable of constituting a mosaic screen.

<10>

The transmission apparatus according to any one of <7> to <9>, in which the broadcast element includes a sessionDescription element indicating information to refer to a session description protocol (SDP) file including an IP address and a port number of multicast by which the content whose URL is indicated by the baseURL attribute included in the broadcast element is to be distributed.

<11>

The transmission apparatus according to any one of <6> to <10>, in which the r12:appServiceDescription element includes an mpdURI attribute indicating a uniform resource identifier (URI) of a media presentation description (MPD) of moving picture experts group-dynamic adaptive streaming over HTTP (MPEG-DASH) which is metadata to perform reproduction control of the content whose distribution method is indicated by the r12:appServiceDescription element.

<12>

A transmission method includes the step of distributing metadata of content, the metadata being described using an attribute and an attribute value and including signaling information indicating that a video is a thumbnail video suitable for constituting a mosaic screen, and the attribute indicating information to refer to a file including information to receive content supplied by a service.

<13>

A reception apparatus includes a reception unit configured to receive metadata of content, the metadata being described using an attribute and an attribute value and including signaling information indicating that a video is a thumbnail video suitable for constituting a mosaic screen, and the attribute indicating information to refer to a file including information to receive content supplied by a service.

<14>

The reception apparatus according to <13>, in which the information to receive the content supplied by the service includes an IP address and a port number of multicast.

<15>

The reception apparatus according to <13> or <14>, in which the file is a session description protocol (SDP) file.

<16>

The reception apparatus according to any one of <13> to <15>, in which the metadata further includes one or more pieces of:
- information on a collection of one or more services;
- information on an individual service;
- a service identifier which is the attribute to identify a service; and
- information on a method for distributing content supplied by a service.

<17>

The reception apparatus according to <16>, in which the metadata is a user service description (USD) of a multimedia broadcast multicast service (MBMS) and includes:
- a bundleDescription element which is the information on the one or more services;
- a bundleDescription/UserServiceDescription element which is the information on the individual service;
- a bundleDescription/userServiceDescription/@serviceId attribute which is the service identifier;
- a bundleDescription/userServiceDescription/DeliveryMethod element which is the information on the method for distributing the content supplied by the service;
- a bundleDescription/userServiceDescription/DeliveryMethod/@ sessionDescriptionURI attribute which is the attribute indicating the information to refer to the file including the information to receive the content supplied by the service; and
- a bundleDescription/userServiceDescription/@r7:serviceClass attribute which is the signaling information.

<18>

The reception apparatus according to <17>, in which the USD further includes an r12:appServiceDescription element indicating that the content supplied by the service is to be distributed by either distribution method of multicast or unicast.

<19>

The reception apparatus according to <18>, in which
the r12:appServiceDescription element includes either or both of a broadcast element or/and a unicast element,
the broadcast element and the unicast element each includes a baseURL attribute indicating a uniform resource locator (URL) of the content supplied by the service,
the broadcast element indicates that the content whose URL is indicated by the baseURL attribute included in the broadcast element is to be distributed by multicast, and
the unicast element indicates that the content whose URL is indicated by the baseURL attribute included in the unicast element is to be distributed by unicast.

<20>

The reception apparatus according to <19>, in which the broadcast element includes, as the signaling information, a thumbnailVideo attribute indicating whether the content whose URL is indicated by the baseURL attribute included in the broadcast element is the thumbnail video.

<21>

The reception apparatus according to <20>, in which the USD includes the /r12:appServiceDescription element of each of a plurality of contents capable of constituting a mosaic screen.

<22>

The reception apparatus according to any one of <19> to <21>, in which the broadcast element includes a sessionDescription element indicating information to refer to a session description protocol (SDP) file including an IP address and a port number of multicast by which the content whose URL is indicated by the baseURL attribute included in the broadcast element is to be distributed.

<23>

The reception apparatus according to any one of <18> to <22>, in which the r12:appServiceDescription element includes an mpdURI attribute indicating a uniform resource identifier (URI) of a media presentation description (MPD) of moving picture experts group-dynamic adaptive streaming over HTTP (MPEG-DASH) which is metadata to perform reproduction control of the content whose distribution method is indicated by the r12:appServiceDescription element.

<24>

A reception method includes the step of receiving metadata of content, the metadata being described using an attribute and an attribute value and including signaling information indicating that a video is a thumbnail video suitable for constituting a mosaic screen, and the attribute indicating information to refer to a file including information to receive content supplied by a service.

<25>

A transmission apparatus includes a distribution unit configured to distribute metadata of content, the metadata being described using an attribute and an attribute value and including signaling information indicating that a video is a thumbnail video suitable for constituting a mosaic screen, and information to refer to a user service description (USD).

<26>

The transmission apparatus according to <25>, in which the metadata further includes:
service information on a service; and
access information which refers to the service information to access a service.

<27>

The transmission apparatus according to <26>, in which the service information includes a service identifier which is the attribute to identify the service information.

<28>

The transmission apparatus according to <27>, in which the access information includes the information to refer to the USD and further includes one or more pieces of;
an access information identifier which is the attribute to identify the access information;
version information which is the attribute indicating a version of description contents of the access information;
information indicating that a service is either of a broadcast type service or a bidirectional type service;
information indicating that a service is a broadcast type service;
information indicating a session description;
information indicating that a service is a bidirectional type service; and
information indicating a class of a service.

<29>

The transmission apparatus according to <28>, in which the metadata is an open mobile alliance-electronic service guide (OMA-ESG) and includes:
a Service element which is the service information;
a Service/@globalserviceId attribute which is the service identifier;
an Access element which is the access information;
an Access/@id attribute which is the access information identifier;
an Access/@version attribute which is the version information;
an Access/AccessType element which is information indicating whether the service is either of a broadcast type service or a bidirectional type service;
an Access/AccessType/BroadcastServiceDelivery element which is information indicating that the service is a broadcast type service;
an Access/AccessType/BroadcastServiceDelivery/SessionDescription element which is information indicating the session description;
an Access/AccessType/UnicastServiceDelivery element which is information indicating that the service is a bidirectional type service;
an Access/ServiceClass element which is information indicating a class of the service; and
an Access/AccessType/BroadcastServiceDelivery/SessionDescription/USBDRef element which is information to refer to the USD.

<30>

The transmission apparatus according to <29>, in which the OMA-ESG includes, as the signaling information, a Service/ServiceType element in which the information indicating that the content supplied by the service is the thumbnail video.

<31>

A transmission method includes the step of distributing metadata of content, the metadata being described using an attribute and an attribute value and including signaling information indicating that a video is a thumbnail video suitable for constituting a mosaic screen, and information to refer to a user service description (USD).

<32>

A reception apparatus includes a reception unit configured to receive metadata of content, the metadata being described using an attribute and an attribute value and including signaling information indicating that a video is a thumbnail video suitable for constituting a mosaic screen, and information to refer to a user service description (USD).

<33>

The reception apparatus according to <32>, in which the metadata further includes:
  service information on a service; and
  access information which refers to the service information to access a service.

<34>

The reception apparatus according to <33>, in which the service information includes a service identifier which is the attribute to identify the service information.

<35>

The reception apparatus according to <34>, in which the access information includes the information to refer to the USD and further includes one or more pieces of;
  an access information identifier which is the attribute to identify the access information;
  version information which is the attribute indicating a version of description contents of the access information;
  information indicating that a service is either of a broadcast type service or a bidirectional type service;
  information indicating that a service is a broadcast type service;
  information indicating a session description;
  information indicating that a service is a bidirectional type service; and
  information indicating a class of a service.

<36>

The reception apparatus according to <35>, in which the metadata is an open mobile alliance-electronic service guide (OMA-ESG) and includes:
  a Service element which is the service information;
  a Service/@globalserviceId attribute which is the service identifier;
  an Access element which is the access information;
  an Access/@id attribute which is the access information identifier;
  an Access/@version attribute which is the version information;
  an Access/AccessType element which is information indicating whether the service is either of a broadcast type service or a bidirectional type service;
  an Access/AccessType/BroadcastServiceDelivery element which is information indicating that the service is a broadcast type service;
  an Access/AccessType/BroadcastServiceDelivery/SessionDescription element which is information indicating the session description;
  an Access/AccessType/UnicastServiceDelivery element which is information indicating that the service is a bidirectional type service;
  an Access/ServiceClass element which is information indicating a class of the service; and
  an Access/AccessType/BroadcastServiceDelivery/SessionDescription/USBDRef element which is information to refer to the USD.

<37>

The reception apparatus according to <36>, in which the OMA-ESG includes, as the signaling information, a Service/ServiceType element in which the information indicating that the content supplied by the service is the thumbnail video.

<38>

A reception method includes the step of receiving metadata of content, the metadata being described using an attribute and an attribute value and including signaling information indicating that a video is a thumbnail video suitable for constituting a mosaic screen, and information to refer to a user service description (USD).

REFERENCE SIGNS LIST 11 channel server
12 aggregation server
13 client
14 NTP server
21 content management server
22 segment streamer
23 MPD server
31 stream aggregator
32 metadata generator
33 FLUTE streamer
34 multicast server
35 web server
410 reception unit
41 middleware
42 DASH client
43 reproduction unit
401 bus
402 CPU
403 ROM
404 RAM
405 hard disk
406 output unit
407 input unit
408 communication unit
409 drive
140 input/output interface
411 removable recording medium

The invention claimed is:

1. A transmission apparatus comprising:
  processing circuitry configured to generate metadata of content, the metadata being described using an attribute and an attribute value and including signaling information indicating that a video is a thumbnail video suitable for constituting a mosaic screen, and the attribute indicating information to refer to a file including information to receive content supplied by a service, wherein the information to receive the content supplied by the service includes an IP address and a port number of multicast; and
  distribution circuitry configured to distribute the metadata, wherein
  the signaling information includes information indicating the content is to be distributed by a distribution method of multicast,
  the information indicating the content is to be distributed by the distribution method of multicast includes an attribute indicating whether the content is the thumbnail video,
  the metadata includes a user service description (USD) of a multimedia broadcast multicast service (MBMS), and
  the USD includes, as a part of the signaling information, a broadcast element indicating that the content supplied by the service is the thumbnail video.

2. The transmission apparatus according to claim 1, wherein the file is a session description protocol (SDP) file.

3. The transmission apparatus according to claim 2, wherein the metadata further includes one or more pieces of:
  information on a collection of one or more services;
  information on an individual service;

a service identifier which is the attribute to identify a service; and information on a method for distributing content supplied by a service.

4. The transmission apparatus according to claim 1, wherein the broadcast element includes, as the signaling information, the attribute indicating whether the content is the thumbnail video as a thumbnailVideo attribute indicating whether the content whose URL is indicated by the baseURL attribute included in the broadcast element is the thumbnail video.

5. The transmission apparatus according to claim 4, wherein the USD includes the /rl2:appServiceDescription element of each of a plurality of contents capable of constituting a mosaic screen.

6. The transmission apparatus according to claim 5, wherein the broadcast element includes a sessionDescription element indicating information to refer to a session description protocol (SDP) file including an IP address and a port number of multicast by which the content whose URL is indicated by the baseURL attribute included in the broadcast element is to be distributed.

7. The transmission apparatus according to claim 6, wherein the rl2:appServiceDescription element includes an mpdURI attribute indicating a uniform resource identifier (URI) of a media presentation description (MPD) of moving picture experts group dynamic adaptive streaming over HTTP (MPEG-DASH) which is metadata to perform reproduction control of the content whose distribution method is indicated by the rl2:appServiceDescription element.

8. A transmission method comprising:
generating, using processing circuitry, metadata of content, the metadata being described using an attribute and an attribute value and including signaling information indicating that a video is a thumbnail video suitable for constituting a mosaic screen, and the attribute indicating information to refer to a file including information to receive content supplied by a service, wherein the information to receive the content supplied by the service includes an IP address and a port number of multicast; and distributing the metadata, wherein the signaling information includes information indicating the content is to be distributed by a distribution method of multicast, the information indicating the content is to be distributed by the distribution method of multicast includes an attribute indicating whether the content is the thumbnail video, the metadata includes a user service description (USD) of a multimedia broadcast multicast service (MBMS), and the USD includes, as a part of the signaling information, a broadcast element indicating that the content supplied by the service is the thumbnail video.

9. A reception apparatus comprising:
reception circuitry configured to receive metadata of content, the metadata being described using an attribute and an attribute value and including signaling information indicating that a video is a thumbnail video suitable for constituting a mosaic screen, and the attribute indicating information to refer to a file including information to receive content supplied by a service, wherein the information to receive the content supplied by the service includes an IP address and a port number of multicast; and processing circuitry configured to process the received metadata, wherein the signaling information includes information indicating the content is to be distributed by a distribution method of multicast, the information indicating the content is to be distributed by the distribution method of multicast includes an attribute indicating whether the content is the thumbnail video, the metadata includes a user service description (USD) of a multimedia broadcast multicast service (MBMS), and the USD includes, as a part of the signaling information, a broadcast element indicating that the content supplied by the service is the thumbnail video.

10. The reception apparatus according to claim 9, wherein the file is a session description protocol (SDP) file.

11. The reception apparatus according to claim 10, wherein the metadata further includes one or more pieces of:
information on a collection of one or more services;
information on an individual service;
a service identifier which is the attribute to identify a service; and
information on a method for distributing content supplied by a service.

12. The reception apparatus according to claim 9, wherein the broadcast element includes the attribute indicating whether the content is the thumbnail video as a thumbnailVideo attribute indicating whether content whose URL is indicated by the baseURL attribute included in the broadcast element is the thumbnail video as the signaling information.

13. The reception apparatus according to claim 12, wherein the USD includes the /rl2:appServiceDescription element of each of a plurality of contents capable of constituting a mosaic screen.

14. The reception apparatus according to claim 13, wherein the broadcast element includes a sessionDescription element indicating information to refer to a session description protocol (SDP) file including an IP address and a port number of multicast by which the content whose URL is indicated by the baseURL attribute included in the broadcast element is to be distributed.

15. The reception apparatus according to claim 13, wherein
the rl2:appServiceDescription element includes an mpdURI attribute indicating a uniform resource identifier (URI) of a media presentation description (MPD) of moving picture experts group dynamic adaptive streaming over HTTP (MPEG-DASH) which is metadata to perform reproduction control of the content whose distribution method is indicated by the rl2:appServiceDescription element.

16. A reception method comprising:
receiving metadata of content, the metadata being metadata to be described using an attribute and an attribute value and including signaling information indicating that a video is a thumbnail video suitable for constituting a mosaic screen, and the attribute indicating information to refer to a file including information to receive content supplied by a service, wherein the information to receive the content supplied by the service includes an IP address and a port number of multicast; and processing, using processing circuitry, the received metadata, wherein the signaling information includes information indicating the content is to be distributed by a distribution method of multicast, the information indicating the content is to be distributed by the distribution method of multicast includes an attribute indicating whether the content is the thumbnail video, the metadata includes a user service description (USD) of a multimedia broadcast multicast service (MBMS), and the USD includes, as a part of the signaling information, a broadcast element indicating that the content supplied by the service is the thumbnail video.

17. The reception method according to claim 16, wherein the file is a session description protocol (SDP) file.

18. The reception method according to claim 17, wherein the metadata further includes one or more pieces of:

information on a collection of one or more services;
information on an individual service;
a service identifier which is the attribute to identify a service; and
information on a method for distributing content supplied by a service.

19. The reception method according to claim 16, wherein the broadcast element includes the attribute indicating whether the content is the thumbnail video as a thumbnailVideo attribute indicating whether content whose URL is indicated by the baseURL attribute included in the broadcast element is the thumbnail video as the signaling information.

20. The reception method according to claim 19, wherein the USD includes the /rl2:appServiceDescription element of each of a plurality of contents capable of constituting a mosaic screen.

21. The reception method according to claim 20, wherein the broadcast element includes a sessionDescription element indicating information to refer to a session description protocol (SDP) file including an IP address and a port number of multicast by which the content whose URL is indicated by the baseURL attribute included in the broadcast element is to be distributed.

22. The reception method according to claim 20, wherein the rl2:appServiceDescription element includes an mpdURI attribute indicating a uniform resource identifier (URI) of a media presentation description (MPD) of moving picture experts group dynamic adaptive streaming over HTTP (MPEG-DASH) which is metadata to perform reproduction control of the content whose distribution method is indicated by the rl2:appServiceDescription element.

23. A transmission apparatus comprising:

processing circuitry configured to generate metadata of content, the metadata being described using an attribute and an attribute value and including signaling information indicating that a video is a thumbnail video suitable for constituting a mosaic screen, and information to refer to a file, wherein the metadata further includes service information on a service and access information which refers to the service information to access a service; and distribution circuitry configured to distribute the metadata, wherein the signaling information includes information indicating the content is to be distributed by a distribution method of multicast, the information indicating the content is to be distributed by the distribution method of multicast includes an attribute indicating whether the content is the thumbnail video, the metadata includes a user service description (USD) of a multimedia broadcast multicast service (MBMS), the file is a session description protocol (SDP) file, and the USD includes, as a part of the signaling information, a broadcast element indicating that the content supplied by the service is the thumbnail video.

24. The transmission apparatus according to claim 23, wherein the service information includes a service identifier which is the attribute to identify the service information.

25. The transmission apparatus according to claim 24, wherein the access information includes the information to refer to the USD and further includes one or more pieces of;

an access information identifier which is the attribute to identify the access information;
version information which is the attribute indicating a version of description contents of the access information;
information indicating that a service is either of a broadcast type service or a bidirectional type service;
information indicating that a service is a broadcast type service;
information indicating a session description;
information indicating that a service is a bidirectional type service; and
information indicating a class of a service.

26. A transmission method comprising:

generating, using processing circuitry, metadata of content, the metadata being metadata to be described using an attribute and an attribute value and including signaling information indicating that a video is a thumbnail video suitable for constituting a mosaic screen, and information to refer to a file, wherein the metadata further includes service information on a service and access information which refers to the service information to access a service; and distributing the metadata, wherein the signaling information includes information indicating the content is to be distributed by a distribution method of multicast, the information indicating the content is to be distributed by the distribution method of multicast includes an attribute indicating whether the content is the thumbnail video, the metadata includes a user service description (USD) of a multimedia broadcast multicast service (MBMS), the file is a session description protocol (SDP) file, and the USD includes, as a part of the signaling information, a broadcast element indicating that the content supplied by the service is the thumbnail video.

27. A reception apparatus comprising:

reception circuitry configured to receive metadata of content, the metadata being described using an attribute and an attribute value and including signaling information indicating that a video is a thumbnail video suitable for constituting a mosaic screen, and information to refer to a file, wherein the metadata further includes service information on a service and access information which refers to the service information to access a service; and processing circuitry configured to process the received metadata, wherein the signaling information includes information indicating the content is to be distributed by a distribution method of multicast, the information indicating the content is to be distributed by the distribution method of multicast includes an attribute indicating whether the content is the thumbnail video, the metadata includes a user service description (USD) of a multimedia broadcast multicast service (MBMS), the file is a session description protocol (SDP) file, and the USD includes, as a part of the signaling information, a broadcast element indicating that the content supplied by the service is the thumbnail video.

28. The reception apparatus according to claim 27, wherein the service information includes a service identifier which is the attribute to identify the service information.

29. The reception apparatus according to claim 28, wherein the access information includes the information to refer to the USD and further includes one or more pieces of;
   access information identifier which is the attribute to identify the access information;
   version information which is the attribute indicating a version of description contents of the access information;
   information indicating that a service is either a broadcast type service or a bidirectional type service;
   information indicating that a service is the broadcast type service;
   information indicating a session description;
   information indicating that a service is the bidirectional type service; and
   information indicating a class of a service.

30. A reception method comprising:
   receiving metadata of content, the metadata being described using an attribute and an attribute value and including signaling information indicating that a video is a thumbnail video suitable for constituting a mosaic screen, and information to refer to a file, wherein the metadata further includes service information on a service and access information which refers to the service information to access a service; and
   processing, using processing circuitry, the received metadata, wherein
   the signaling information includes information indicating the content is to be distributed by a distribution method of multicast,
   the information indicating the content is to be distributed by the distribution method of multicast includes an attribute indicating whether the content is the thumbnail video,
   the metadata includes a user service description (USD) of a multimedia broadcast multicast service (MBMS), the file is a session description protocol (SDP) file, and
   the USD includes, as a part of the signaling information, a broadcast
   element indicating that the content supplied by the service is the thumbnail video.

31. The reception method according to claim 30, wherein the service information includes a service identifier which is the attribute to identify the service information.

32. The reception method according to claim 31, wherein the access information includes the information to refer to the USD and further includes one or more pieces of;
   access information identifier which is the attribute to identify the access information;
   version information which is the attribute indicating a version of description contents of the access information;
   information indicating that a service is either a broadcast type service or a bidirectional type service;
   information indicating that a service is the broadcast type service;
   information indicating a session description;
   information indicating that a service is the bidirectional type service; and
   information indicating a class of a service.

* * * * *